US011604675B2

(12) United States Patent
Miller et al.

(10) Patent No.: US 11,604,675 B2
(45) Date of Patent: Mar. 14, 2023

(54) ENABLING WORKERS TO SWAP BETWEEN MOBILE DEVICES

(71) Applicant: Vocollect, Inc., Pittsburgh, PA (US)

(72) Inventors: Gary W. Miller, Normalville, PA (US); Graham P. Byrne, wexford, PA (US)

(73) Assignee: VOCOLLECT, INC., Pittsburgh, PA (US)

(*) Notice: Subject to any disclaimer, the term of this patent is extended or adjusted under 35 U.S.C. 154(b) by 176 days.

(21) Appl. No.: 17/192,579

(22) Filed: Mar. 4, 2021

(65) Prior Publication Data

US 2022/0283849 A1 Sep. 8, 2022

(51) Int. Cl.
*G06F 9/48* (2006.01)
*G10L 15/22* (2006.01)
*G10L 15/30* (2013.01)
*H04W 4/80* (2018.01)
*H04B 5/00* (2006.01)
*H04M 1/72412* (2021.01)

(52) U.S. Cl.
CPC ............ *G06F 9/4862* (2013.01); *G10L 15/22* (2013.01); *G10L 15/30* (2013.01); *H04B 5/0031* (2013.01); *H04M 1/72412* (2021.01); *H04W 4/80* (2018.02); *G10L 2015/223* (2013.01)

(58) Field of Classification Search
CPC ....... G06F 9/4862; G10L 15/22; G10L 15/30; G10L 2015/223; H04B 5/0031; H04M 1/72412; H04W 4/80
See application file for complete search history.

(56) References Cited

U.S. PATENT DOCUMENTS

| 9,171,268 | B1 | 10/2015 | Penilla et al. |
| 9,324,322 | B1* | 4/2016 | Torok ..................... H04R 3/02 |
| 9,440,550 | B2 | 9/2016 | Jones |
| 9,843,660 | B2 | 12/2017 | Dipiazza et al. |
| 10,142,750 | B2 | 11/2018 | Hariharan et al. |

(Continued)

FOREIGN PATENT DOCUMENTS

IN 202011048831 A 11/2020

OTHER PUBLICATIONS

U.S. Appl. No. 62/097,480, filed Dec. 29, 2014.
U.S. Appl. No. 62/101,568, filed Jan. 9, 2015.

*Primary Examiner* — Tonia L Dollinger
*Assistant Examiner* — Linh T. Nguyen
(74) *Attorney, Agent, or Firm* — Alston & Bird LLP

(57) ABSTRACT

A method for identifying a second device by a first device for establishing a communication between the first device and the second device is described here. The method includes receiving, by a processor of a first device, a voice command from a worker in a workplace. In an example, the method comprises pausing, by the processor, a workflow operation executing on the first device. The method further comprises performing, by the processor, a voice recognition to analyze the voice command of the worker. The method includes activating, by the processor, a communication module of the first device based on the voice recognition, to identify a second device in proximity to the first device. The method includes terminating, by the processor, a connection between the first device and the wearable electronic device. Thus, terminating, by the processor, a second connection of the first device with the second device.

13 Claims, 13 Drawing Sheets

(56) References Cited

U.S. PATENT DOCUMENTS

| | | | | |
|---|---|---|---|---|
| 2008/0004021 A1* | 1/2008 | Sanjay | ................ | H04W 36/18 |
| | | | | 455/436 |
| 2011/0009075 A1* | 1/2011 | Jantunen | ............ | G06K 19/0723 |
| | | | | 709/227 |
| 2012/0290121 A1* | 11/2012 | Gronbach | ............... | G10L 15/22 |
| | | | | 700/180 |
| 2014/0131324 A1* | 5/2014 | Shipulski | ............. | B23K 10/006 |
| | | | | 219/121.54 |
| 2020/0186636 A1* | 6/2020 | Wall | ....................... | H04M 1/05 |
| 2021/0158241 A1* | 5/2021 | Nashif | ........... | G06Q 10/063114 |
| 2021/0329424 A1* | 10/2021 | Barzuza | ............ | H04M 1/72451 |

* cited by examiner

ENABLING WORKERS TO SWAP BETWEEN MOBILE DEVICES

TECHNOLOGICAL FIELD

Example embodiments described herein relate generally to systems, methods, and apparatuses to facilitate swapping between a plurality of mobile devices.

BACKGROUND

In modern production environments and warehouses, it is increasingly desirable for human operators to be able to change devices in case a battery of a mobile device depletes. This typically entails the use of portable electronic voice-processing devices which can detect human speech, interpret the speech, and process the speech to recognize words, to control nearby electronic devices for swapping.

SUMMARY

The following presents a simplified summary to provide a basic understanding of some aspects of embodiments described herein. This summary is not an extensive overview and is intended to neither identify key or critical elements nor delineate the scope of such elements. Its purpose is to present some concepts of the described features in a simplified form as a prelude to the more detailed description that is presented later.

A first device is described in accordance with some example embodiments. The first device includes a memory to store computer-executable instructions and a processor in communication with a server, the processor performs operations in response to executing the computer-executable instructions. The operations can include receiving a voice command from a worker in a workplace. In this regard, the voice command is indicative of a battery level of the first device. Further, the operations can include pausing a workflow operation executing on the first device. Furthermore, the operations can include performing via a speech recognizer of the first device, a voice recognition to analyze the voice command of the worker. Furthermore, the operations can include activating based on the voice recognition, a communication module of the first device to identify a second device in proximity to the first device. Further, the operations can include terminating a connection between the first device and the wearable electronic device. Furthermore, the operations can include transferring information from the first device to the second device.

A system is described in accordance with another example embodiments. The system includes a server communicatively coupled to one or more devices, the server comprises a processor that is configured to perform the steps. The processor is configured to determine a first battery level of a first device among the one or more devices. The processor then generates a notification to the first device indicating that the first battery level is below a threshold value. Further, the processor is configured to pause a workflow operation executing on the first device. Furthermore, the processor then identifies a second device among the one or more devices having a second battery level above the threshold value. The processor of the server then directs the identified second device to resume the workflow operation from a step where the workflow operation was paused.

According to some example embodiments, the method includes receiving, by a processor of a first device, a voice command from a worker in a workplace. The voice command is indicative of a battery level of the first device. Further, the method includes pausing, by the processor, a workflow operation executing on the first device. Furthermore, the method includes performing, by the processor, a voice recognition to analyze the voice command of the worker. Further, the method includes activating, by the processor, a communication module of the first device based on the voice recognition, to identify a second device in proximity to the first device. Furthermore, the method includes terminating, by the processor, a connection between the first device and the wearable electronic device. The method further includes transferring, by the processor, information from the first device to the second device.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
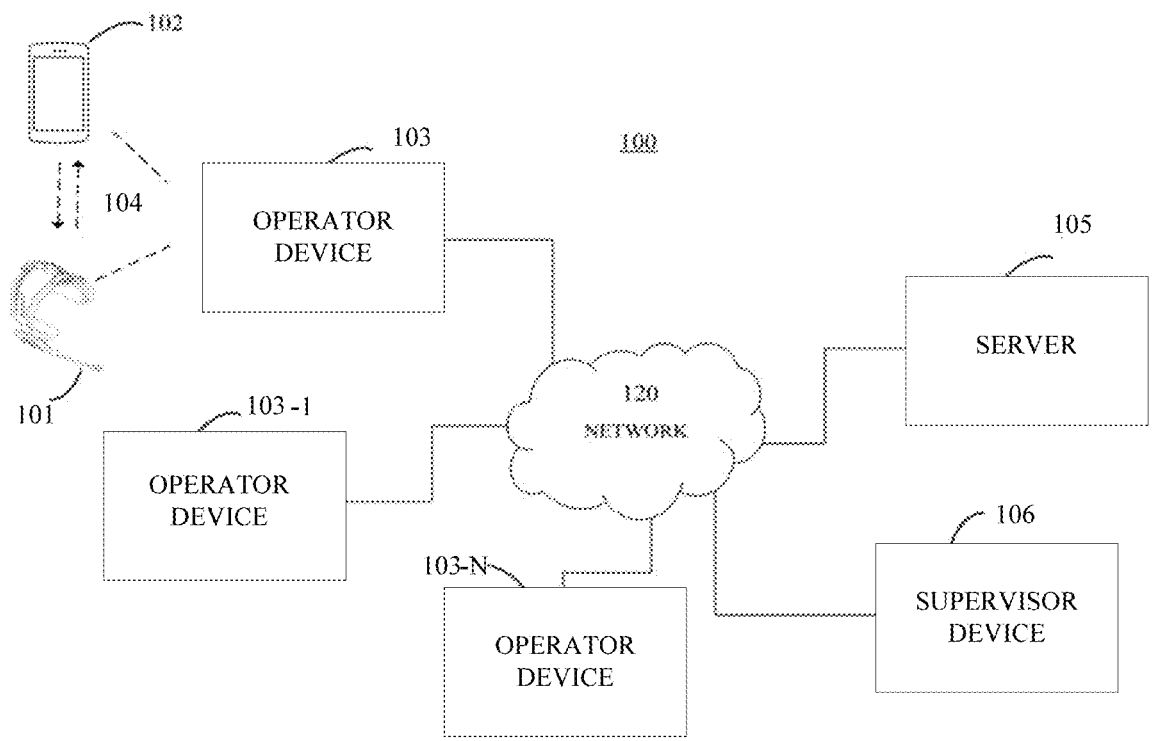
FIG. 1 illustrates a schematic of a workflow performance system according to an example embodiment.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Generally, in a work environment, it can be desirable for a worker to swap from one device to another device in case a battery of a device in-use gets depleted. In an example embodiment, the worker might be performing a workflow operation utilizing a wearable electronic device and a mobile device (for example, a handheld computer or a portable computer). The on-going workflow execution might be paused when a battery of the mobile device in-use gets drained. The worker performing the workflow operation with the mobile device can issue a voice command indicating that the battery of the mobile device is low. After the voice command is recognized, a communication module (for example, an NFC module) of the mobile device can be activated to identify another mobile device in proximity. A connection between the wearable electronic device and the mobile device can be terminated so as to establish a new connection between the another mobile device and the wearable electronic device. The another mobile device once identified can be swapped with the mobile device to resume the workflow operation. Information from the mobile device in-use can be transferred to the another mobile device. Then, the workflow execution can be resumed by the identified another mobile device from the point where it was paused.

In an alternate example embodiment, it can be desirable to notify the worker that the battery of the mobile device in-use is draining. In warehouses, a management system can monitor battery levels of all the devices being used by the workers for performing the workflow operations. The management system can determine if a battery of a device is low and there is a need to either change the device or charge the battery of the device. The workflow operation being performed in the device can be paused. The management system can send notification to an operator of the device in-use to indicate that the battery level of the device is about to drain. A connection between the device in-use and the wearable electronic device can be terminated so as to establish a new connection between the another device and the wearable electronic device. Further, the management can identify another device which may be fully charged to replace the device that is draining. In an embodiment, the nother device selected for swapping can be identified in response to the nother device generating an alert, for example, displaying a name of the worker handling the draining device. The management system can also prepare the another device for replacement by transferring information to the another device.

The worker who may be working in demanding environment, might need to concentrate on an allocated task without any interruption. The worker might be using multiple devices to perform the allocated task, for example, a mobile device connected with peripheral devices such as headsets, scanners, pocket printers, PDTs, terminal devices, etc. When the worker determines that a battery of the mobile device is about to deplete soon, he might be required to swap the mobile device with a new fully charged device. However, a process of swapping between the device can be time consuming and inefficient. The worker might need to sign off from the device in-use and then sign-in to a new mobile device. The worker might need to download all the relevant information, tasks, templates in the new device so as to resume the workflow operations. Further, the worker may have to re-connect all the peripheral devices with the new mobile device. Therefore, the present disclosure can provide an efficient method of identifying a near-by target device (for example, via a Bluetooth low energy protocol) to swap with the draining device based on voice commands issued by the worker or based on monitoring the battery level of the device by a server. The target device can then be provided with the information of the draining device so that the identified target device can establish connections with the peripheral devices and can resume the workflow execution. The worker might not need to manually connect each of the peripheral devices with the mobile device. Also, the worker might not need to sign-in in the target device manually. In this way, the overall efficiency of the worker can be improved and thereby, reducing the time of connection and disconnection of peripheral devices. Details of various example embodiments for generating the alerts, are described in reference to FIGS. 1-13 hereinafter.

The term "electronic device" used hereinafter refers to any or all of, handheld devices, mobile phones, wearable devices, personal data assistants (PDAs), tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The various embodiments are described herein using the term "computing platform" or "master device" used interchangeably for the purpose of brevity. The term "computing platform" can be used herein to refer to any computing device or a distributed network of computing device capable of functioning as a server, such as a master exchange server, web server, mail server, document server, or any other type of server. A computing platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smartphone, thereby enabling it to function as an Internet server (e.g., an enterprise e-mail server) only to the extent necessary to provide the functionality described herein.

In some example embodiments, the computing platform may correspond to any of, an industrial computer, a cloud computing-based platform, an external computer, a stand-alone computing device, and/or the like. In some example embodiments, the master device, or the computing platform, can also refer to any of the electronic devices, as described herein. In some example embodiments, the computing platform may include an access point or a gateway device that can be capable of communicating directly with one or more electronic devices and can also be capable of communicating (either directly or alternatively indirectly via a communication network such as the Internet) with a network establishment service (e.g. Internet service provider). In some example embodiments, the computing platform can refer to a server system that can manage the deployment of one or more electronic devices throughout a physical environment. In some example embodiments, the computing platform may refer to a network establishment service including distributed systems where multiple operations are performed by utilizing multiple computing resources deployed over a network and/or a cloud-based platform or cloud-based services, such as any of a software-based service (SaaS), infrastructure-based service (IaaS) or platform-based service (PaaS) and/or like.

Referring now to FIG. 1, illustrated is a workflow performance system 100 including an example network architecture for a system, which may include one or more devices and sub-systems that can be configured to implement some embodiments discussed herein. For example, workflow performance system 100 can include server 105, which can include, for example, the circuitry disclosed in FIGS. 2-4, a server, or database, among other things (not shown). The server 105 may include any suitable network server and/or other type of processing device. In some embodiments, the server 105 may receive requests and transmit information or indications regarding such requests to operator devices 103-103N and/or one or more supervisor devices 106. The operator devices 103-103N referred herein can correspond to electronic devices that may be used by operators (e.g. workers) in a work environment while performing various tasks. Further, the supervisor devices 106 referred herein can correspond to electronic devices used by a supervisor of the operators in the work environment. In an example, the work environment can correspond to a warehouse or inventory and the supervisor can be a warehouse manager.

In some example embodiments, the server 105 can communicate with one or more operator devices 103-103N and/or one or more supervisor devices 106 via network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 120 may include a cellular telephone, an 802.11, 802.16, 802.20, and/or WiMax network. In some embodiments, Bluetooth may be used to communicate between devices. Further, the network 120 may include a public network, such as the Internet, a private network, such as an intranet, or combinations thereof, and may utilize a variety of networking protocols now available or later developed including, but not limited to TCP/IP based networking protocols.

In some example embodiments, the network 120 can include, but are not limited to, a Wireless Fidelity (Wi-Fi) network, a Piconet, a Personal Area Network (PAN), Zigbee, and a Scatter net. In some examples, the network 120 can correspond to a short-range wireless network through which the operator devices 103-103N can communicate with each other using one or more communication protocols such as, but are not limited to, Wi-Fi, Bluetooth, Bluetooth low energy (BLE), Zigbee, Ultrasonic frequency based network, and Z-Wave. In some examples, the network 120 can correspond to a network in which the plurality of electronic devices can communicate with each other using other various wired and wireless communication protocols such as Transmission Control Protocol and Internet Protocol (TCP/IP), User Datagram Protocol (UDP), and 2G, 3G, or 4G communication protocols. In some examples, the network 120 can correspond to any communication network such as, but not limited to, LORA, cellular (NB IoT, LTE-M, Leaky Feeder Coax, etc.)

In some example embodiments, the operator devices 103-103N, supervisor device 106, and/or server 105 may each be implemented as a computing device, such as a personal computer and/or other networked device, such as a cellular phone, tablet computer, mobile device, point of sale terminal, inventory management terminal etc. The depiction in FIG. 1 of "N" members is merely for illustration purposes. Further, while only one supervisor device 106 is illustrated in FIG. 1, in some embodiments, multiple or a plurality of supervisor device 106 may be connected in the system. Furthermore, any number of users, operator devices and/or supervisor devices may be included in the workflow performance system 100. In one embodiment, the operator devices 103-103N and/or supervisor devices 106 may be configured to display an interface on a display of the respective device for viewing, creating, editing, and/or otherwise interacting with the server. According to some embodiments, the server 105 may be configured to display the interface on a display of the server 105 for viewing, creating, editing, and/or otherwise interacting with information on the server 105. In some embodiments, an interface of operator devices 103-103N and/or supervisor device 106 may be different from an interface of a server 105. Various components of the present system may be performed on one or more of the operator devices 103-103N, supervisor device 106, or server 105. Workflow performance system 100 may also include additional client devices and/or servers, among other things.

According to some example embodiments, the operator devices 103-103N can include, for example, but not limited to, an electronic device 102 (e.g. a mobile device, a PDA etc.) and a voice-controlled apparatus 101 (e.g. a headset device, a wearable head mounting device, a wearable electronic device etc.). In this regard, an operator in the work environment can use the electronic device 102 and/or the voice-controlled apparatus 101 to perform one or more operations in the work environment. For instance, in some example embodiments, the operator devices 103-103N can be used by operators to execute a workflow operation that can include one or more tasks. In this regard, in some examples, the workflow operation can include a sequence or series of steps to be performed by the operator. In some example embodiments, one or more steps of the workflow operation can be provided in form of voice directed instructions or graphical user interface (GUI) based instructions to the operators on the operator devices 103-103N.

As an example, in a work environment (e.g. a warehouse, an industrial environment, a distribution center, etc.), an operator can use the electronic device 102 that can be preconfigured with an application (e.g. a mobile application) to execute a workflow operation. For instance, in some examples, the operators can use these devices (i.e. the operator devices 103-103N, electronic devices, for example, 102) for automatic identification and data capturing of information and to improve productivity in the work environment. In some examples, the application can be used to execute various steps of the workflow operation. According to some example embodiments, the application can be installed on at least one of the electronic device 102 and the voice-controlled apparatus 101 and can be used to generate instructions for the operators at each step of the workflow operation. These instructions can be provided on the electronic device 102 and/or the voice-controlled apparatus 101.

According to some example embodiments, the voice-controlled apparatus 101 can be used to provide instructions to the operators in form of 'voice prompts' to perform various activities in the work environment. For instance, in an example, for a picking workflow operation, the operators can be provided instructions in form of voice prompts on the voice-controlled apparatus 101 for picking various items in an inventory. The voice prompts in such case may include instructions for the operators, like, but not limited to, 'reach to a location of the inventory', 'confirm a check-digit associated with the location', 'identify an item from amongst several item', 'confirm a stock-keeping unit (SKU) associated with the item', 'pick the item', 'move to next location', and so on. Further, in some example embodiments, the electronic device 102 can be configured to provide instructions to the operators in visual form i.e. instructions that can be displayed on a GUI of the electronic device 102. Accordingly, the operators can perform a step of the workflow operation based on instructions provided in the voice prompt and/or visual prompt. Further, the electronic device 102 and/or the voice-controlled apparatus 101 can be configured to receive operator's response to the instructions. For instance, as the operators perform the task, the operators can provide a 'voice response' and/or a GUI input based response on the voice-controlled apparatus 101 and/or the electronic device 102, respectively.

Illustratively, the operator devices 103-103N can be communicatively coupled over the network 120. Similarly, in accordance with some example embodiments, the electronic device 102 can be communicatively coupled to the voice-controlled apparatus 101 via the network 120. As an example, the voice-controlled apparatus 101 can be communicatively coupled to the electronic device 102 over a Bluetooth communication based network. In this regard, the electronic device 102 can exchange data and various commands with the voice-controlled apparatus 101 using the Bluetooth network.

In some examples, voice-based instructions and visual-based instructions of the task of the workflow can be provided simultaneously on the voice-controlled apparatus 101 and the electronic device 102, respectively. In this regard, a state of execution of workflow on the electronic device 102 and the voice-controlled apparatus 101 can be synchronized such that, either of a voice response and/or a GUI based input can be provided by the operator in response to the voice prompt and/or visual instruction for a same step of workflow operation to cause the workflow operation to move to a next state on both the voice-controlled apparatus 101 and the electronic device 102.

According to some example embodiments, the operator devices 103-103N can receive a file including one or more workflows that are to be executed on the operator device 103-103N. In this regard, according to some example embodiments, a workflow operation can be executed on the operator devices 103-103N (e.g., the electronic device 102 and/or the voice-controlled apparatus 101) based on exchange of messages between the devices. In some example embodiments, the operator devices 103-103N can receive the file including the one or more workflows from the server 105.

According to some example embodiments, the electronic device 102, the voice-controlled apparatus 101, the operator devices 103-103N, supervisor device 106, and/or server 105 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the operator devices 103-103N, supervisor device 106, and/or server 105 may include one or more output devices, including but not limited to a display, a speaker, a haptic feedback mechanism, a printer, lights, any other mechanism capable of presenting an output to a user, or any combination thereof.

The operator devices 103-103N, supervisor device 106, and/or server 105 may include components for monitoring and/or collecting information regarding the user or external environment in which the component is placed. For instance, the operator devices 103-103N, supervisor device 106, and/or server 105 may include sensors, scanners, and/or other monitoring components. In some embodiments, scanners may be used to determine the presence of certain individuals or items. For example, in some embodiments, the components may include a scanner, such as an optical scanner, RFID scanner, and/or other scanner configured to read human and/or machine readable indicia physically associated with an item.

Figure 2:
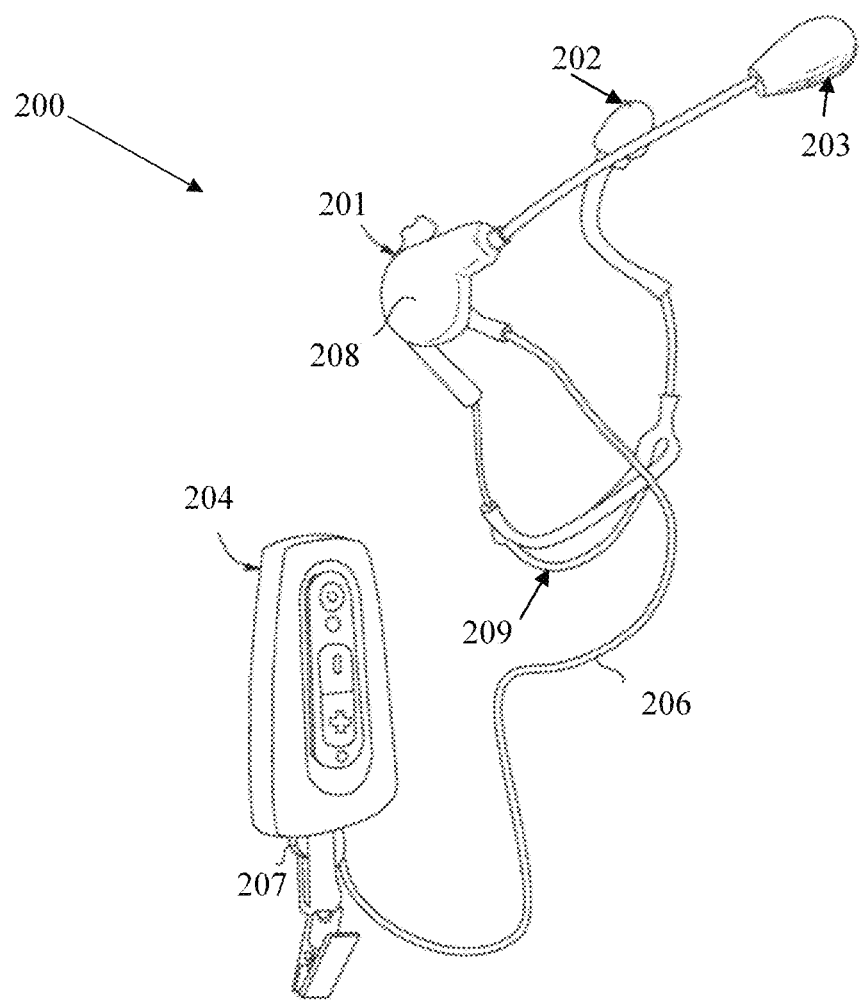
FIG. 2 illustrates an exemplary voice-controlled apparatus used for performing a workflow operation, according to an example embodiment.

FIG. 2 illustrates an exemplary voice-controlled apparatus 200 according to an example embodiment. In the embodiment illustrated in FIG. 2, the voice-controlled apparatus 200 can correspond to a headset that can include a wireless enabled voice recognition device that utilizes a hands-free profile.

In accordance with some example embodiments, the headset may be substantially similar to the headset disclosed in U.S. Provisional Patent Application No. 62/097,480 filed Dec. 29, 2014, U.S. Provisional Patent Application No. 62/101,568, filed Jan. 9, 2015, and U.S. patent application Ser. No. 14/918,969, and the disclosures therein are hereby incorporated by reference in their entireties.

In accordance with an example embodiment, as illustrated, the voice-controlled apparatus 200 can include an electronic module 204. In this embodiment, some elements can be incorporated into an electronics module 204 rather than the headset 201, to provide a long battery life consistent with long work shifts. As an example, one or more components of circuitry 200 may be incorporated in the electronic module 204 and/or the headset 201. In some example embodiments, the electronics module 204 can be remotely coupled to a light-weight and comfortable headset 201 secured to a worker head via a headband 209. In some example embodiments, the headband 209 can be a band that is designed to fit on a worker's head, in an ear, over an ear, or otherwise designed to support the headset. The headset 201 can include one or more speakers 202 and can further include one or more microphones. For instance, in the embodiment illustrated in FIG. 2, the headset 201 includes microphones 203, 208. According to some example embodiments, the microphone 208 can provide noise cancellation by continuously listening to and blocking environmental sounds to enhance voice recognition and optionally provide for noise cancellation. In some embodiments (not shown), the electronics module 204 can be integrated into the headset 201 rather than being remotely coupled to the headset 201. Various configurations of the voice-controlled apparatus 200 can be used without deviating from the intent of the present disclosure.

In some example embodiments, the electronics module 204 can be used to offload several components of the headset 201 to reduce the weight of the headset 201. In some embodiments, one or more of a rechargeable or long life battery, display, keypad, Bluetooth® antenna, and printed circuit board assembly (PCBA) electronics can be included in the electronics module 204 and/or otherwise incorporated into the voice-controlled apparatus 200.

In the embodiment illustrated in FIG. 2, the headset 201 can be coupled to the electronics module 204 via a communication link such as a small audio cable 206 but could instead communicate with the electronics module 204 via a wireless link. In an example embodiment, the headset 201 can be of a low profile. For instance, headset 201 can be minimalistic in appearance in some embodiments, such as a Bluetooth earpiece/headphone.

According to some example embodiments the electronics module 204 can be configured to be used with various types of headsets 201. In some example embodiments, the electronics module 204 can read a unique identifier (I.D.) of the headset 201, which can be stored in the circuitry of the voice-controlled apparatus 200 (e.g., the circuitry 200) and can also be used to electronically couple the speakers and microphones to electronics module 204. In one embodiment, the audio cable 206 can includes multiple conductors or communication lines for signals which can include a speaker +, speaker −, ground digital, microphone, secondary microphone, and microphone ground. In some examples, the electronics module 204 can utilize a user configurable attachment 207, such as a plastic loop, to attach to a user. For instance, in the embodiment illustrated in FIG. 2, the electronics module 204 can be mounted to a worker torso via a lapel clip and/or lanyard. When a wireless link between the headset 201 and electronics module 204 is used, such as a Bluetooth type of communication link, the headset 201 can include a small lightweight battery. The communication link can provide wireless signals suitable for exchanging voice communications.

In some embodiments, voice templates for performing a speaker dependent training of a speech recognition model can be stored locally in the electronic module 204 and/or the headset 201 as part of the circuitry 200 to recognize a user's voice interactions and may convert the interaction into text based data and commands for interaction with an application running in the circuitry 200. For example, the voice-controlled apparatus 200 can perform voice recognition in one embodiment utilizing the voice templates. According to some example embodiments, first few stages of voice recognition can be performed in the voice-controlled apparatus 200, with further stages performed on a server 105. In further embodiments, raw audio can be transmitted from voice-controlled apparatus 200 to the server 105 where the final stages of voice recognition can be completed. Alternatively, in some example embodiments, the voice recognition can be performed on the voice-controlled apparatus 200.

Figure 3:
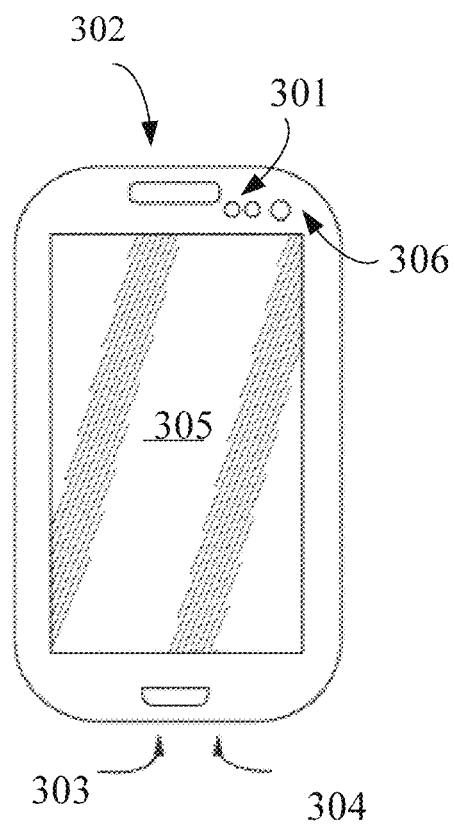
FIG. 3 illustrates an exemplary user device according to an example embodiment.

FIG. 3 illustrates an exemplary user device according to an example embodiment. In the embodiment illustrated in FIG. 3, the user device is a handset 302 (e.g., a mobile device or tablet device). The handset 302 may include one or more components of circuitry as explained with regards to FIG. 1 and may include one or more of the components discussed with regards to the headset of FIG. 2 (e.g., voice templates, speech encoders, etc.). The handset 302 may include one or more microphones 303 and one or more speakers 304, which may be connected to a set of headphones. The handset 302 can also include one or more antenna. The microphone 303 receives speech or sound and transmits the received speech and sound to one or more components of circuitry 400 (to be shown in FIG. 4) in the handset 302. The speakers 304 receive an audio transmission from one or more components of circuitry 400 in the handset 302 and output the audio transmission in the form of speech or sound. In an embodiment, the speakers 304 can also include noise cancellation. The handset 302 may connect with one or more other operator devices 103-103N and/or server 105 as explained with regards to FIG. 1. For instance, in some embodiments, the handset 302 may connect to a wireless headphone via a Bluetooth connection or via an NFC module, where the wireless headphone includes a microphone and speaker for receiving speech and outputting speech or sound. The handset 302 can include a speech recognizer unit to perform speech recognition of the speech input. The handset 302 can also include a user input device and output device (such as the display 305 forming an interface) to send and receive additional non-auditory information from circuitry 400, whether incorporated into the handset 302 or in other operator devices 103-103N and/or server 105. The display 305 of FIG. 3 may be a backlit LCD or OLED display. With the use of a handset 302 having one or more microphones 303 and one or more speakers 304, a user can communicate with a central server (e.g., server 105) and/or with other user devices (e.g., operator devices 103-103N).

In the embodiment illustrated in FIG. 3, the user device may include a sensor 301 configured to determine the location of the user device and an LED 306 to provide notification or alert to the user. The sensor 301 may include, but may not be limited to, a ground imaging sensor, an electro-optic sensor, a GPS receiver, accelerometer, and the like. In an embodiment, the sensor 301 may determine a location of the user by determining GPS coordinates of the operator devices 103-103N and/or a vehicle. The sensor 301 may communication or interact with other components of the circuitry 400, such as processor 404, to determine whether the user is in transit, such as in transit to a desired location. The processor 404 may then interact with the display 305 to lock the display while the user is in transit or in motion. In other embodiment, the display 305 can also facilitate user interaction via a haptic touch or through a stylus pen. The processor 404 may also unlock the display 305 when the user is determined to not be in transit or in motion and/or has arrived at the desired location. One or more applications may be used to lock and unlock the display 305 depending on the status of the user and/or user device.

Although FIG. 3 illustrates one example of a handheld device, various changes may be made to FIG. 3. For example, all or portions of FIG. 3 may represent or be included in other handheld devices and/or vehicle communication devices and may be used in conjunction with a headset such as the headset of FIG. 2. Also, the functional division shown in FIG. 3 is for illustration only. Various components could be combined, subdivided, or omitted and additional components could be added according to particular needs.

One suitable device for implementing the present disclosure may be the TALKMAN® product available from VOCOLLECT™ of Pittsburgh, Pa. In accordance with one aspect of the present disclosure, the user device uses a voice-driven system, which may use speech recognition technology for communication. In an embodiment, the user device may provide hands-free voice communication between the user and the user device. To that end, digital information may be converted to an audio format, and vice versa, to provide speech communication between the user device or an associated system and the user. In an example embodiment, the user device may contain digital instructions or receive digital instructions from a central computer and/or a server and may convert those instructions to audio to be heard by the user. The user may then reply, in a spoken language, and the audio reply or the speech input may be converted to a useable digital format to be transferred back to the central computer and/or the server. In other embodiments, the user device may operate independently, in an offline mode, such that speech digitization, recognition and/or synthesis for implementing a voice-driven workflow solution may be performed by the user device itself.

Figure 4:
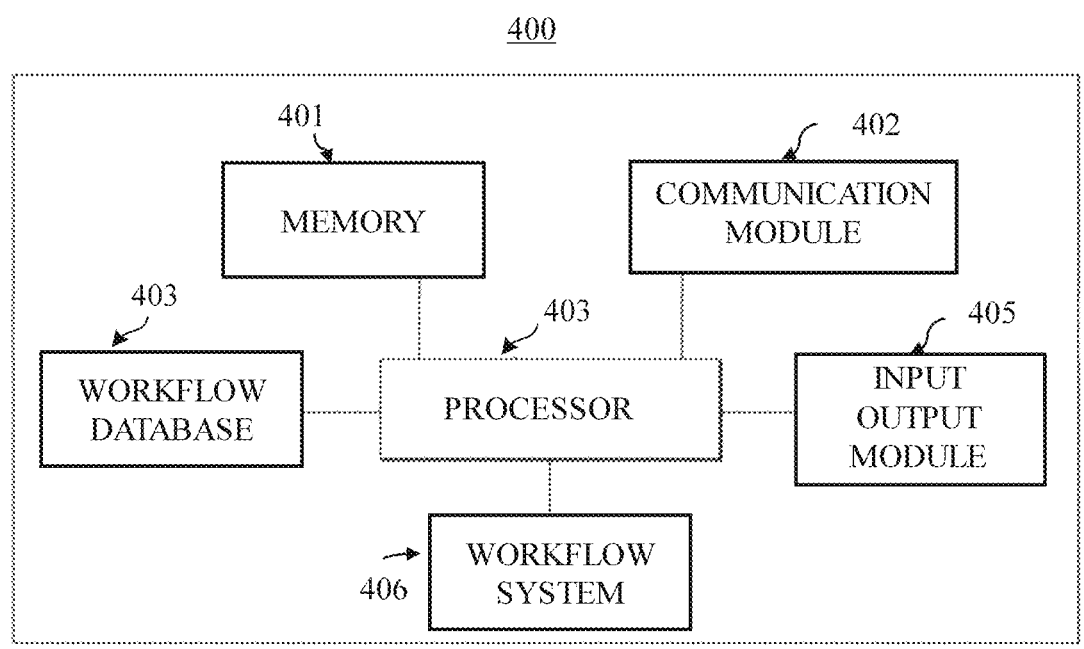
FIG. 4 illustrates a schematic block diagram of a workflow performance system according to an example embodiment.

FIG. 4 shows a schematic block diagram of circuitry 400, some or all of which may be included in, for example, the voice-controlled apparatus 101, the electronic device 102, the operator devices 103-103N, the supervisor device 106, and/or the server 105. Any of the aforementioned systems or devices may include the circuitry 400 and may be configured to, either independently or jointly with other devices in a network 120 perform the functions of the circuitry 400 described herein. As illustrated in FIG. 4, in accordance with some example embodiments, circuitry 400 can includes various means, such as memory 401, communications module 402, processor 404, and/or input/output module 405. In some embodiments, workflow database 403 and/or workflow system 406 may also or instead be included. As referred to herein, "module" includes hardware, software and/or firmware configured to perform one or more particular functions. In this regard, the means of circuitry 400 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 401) that is executable by a suitably configured processing device (e.g., processor 404), or some combination thereof.

Processor 404 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments processor 404 comprises a plurality of processors. The plurality of processors may be embodied on a single computing device or may be distributed across a plurality of computing devices collectively configured to function as circuitry 400. The plurality of processors may be in operative communication with each other and may be collectively configured to perform one or more functionalities of circuitry 400 as described herein. In an example embodiment, processor 404 is configured to execute instructions stored in memory 401 or otherwise accessible to processor 404. These instructions, when executed by processor 404, may cause circuitry 400 to perform one or more of the functionalities of circuitry 400 as described herein.

Whether configured by hardware, firmware/software methods, or by a combination thereof, processor 404 may comprise an entity capable of performing operations according to embodiments of the present invention while configured accordingly. Thus, for example, when processor 404 is embodied as an ASIC, FPGA or the like, processor 404 may comprise specifically configured hardware for conducting one or more operations described herein. Alternatively, as another example, when processor 404 is embodied as an executor of instructions, such as may be stored in memory 401, the instructions may specifically configure processor 404 to perform one or more algorithms and operations described herein, such as those discussed in connection with FIGS. 1-13.

Memory 401 may comprise, for example, volatile memory, non-volatile memory, or some combination thereof. Although illustrated in FIG. 4 as a single memory, memory 401 may comprise a plurality of memory components. The plurality of memory components may be embodied on a single computing device or distributed across a plurality of computing devices. In various embodiments, memory 401 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 401 may be configured to store information, data (including item data and/or profile data), applications, instructions, or the like for enabling circuitry 400 to carry out various functions in accordance with example embodiments of the present invention. For example, in at least some embodiments, memory 401 is configured to buffer input data for processing by processor 404. Additionally, or alternatively, in at least some embodiments, memory 401 is configured to store program instructions for execution by processor 404. Memory 401 may store information in the form of static and/or dynamic information. This stored information may be stored and/or used by circuitry 400 during the course of performing its functionalities.

Communication module 402 may be embodied as any device or means embodied in circuitry, hardware, a computer program product comprising computer readable program instructions stored on a computer readable medium (e.g., memory 401) and executed by a processing device (e.g., processor 404), or a combination thereof that is configured to receive and/or transmit data from/to another device and/or network, such as, for example, a second circuitry 400 and/or the like. In some embodiments, communication module 402 (like other components discussed herein) can be at least partially embodied as or otherwise controlled by processor 404. In this regard, communication module 402 may be in communication with processor 404, such as via a bus. Communication module 402 may include, for example, an antenna, a transmitter, a receiver, a transceiver, network interface card and/or supporting hardware and/or firmware/software for enabling communications with another computing device. Communication module 402 may be configured to receive and/or transmit any data that may be stored by memory 401 using any protocol that may be used for communications between computing devices. Communication module 402 may additionally or alternatively be in communication with the memory 401, input/output module 405 and/or any other component of circuitry 400, such as via a bus.

Input/output module 405 may be in communication with processor 404 to receive an indication of a user input and/or to provide an audible, visual, mechanical, or other output to a user (e.g., employee and/or customer). Some example visual outputs that may be provided to a user by circuitry 400 are discussed in connection with FIGS. 1-13. As such, input/output module 405 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 400 is embodied as a server or database, aspects of input/output module 405 may be reduced as compared to embodiments where circuitry 400 is implemented as an end-user machine (e.g., remote worker device and/or employee device) or other type of device designed for complex user interactions. In some embodiments (like other components discussed herein), input/output module 405 may even be eliminated from circuitry 400. Alternatively, such as in embodiments wherein circuitry 400 is embodied as a server or database, at least some aspects of input/output module 405 may be embodied on an apparatus used by a user that is in communication with circuitry 400. Input/output module 405 may be in communication with the memory 401, communication module 402, and/or any other component(s), such as via a bus. One or more than one input/output module and/or another component can be included in circuitry 400.

The workflow database 403 and the workflow system 406 may also or instead be included and configured to perform the functionality discussed herein related to workflow and/or identifying performance status associated with an execution of the workflow. In some embodiments, some or all of the functionality of generating and/or information for workflow and/or performance status associated with execution of the workflow may be performed by processor 404. In this regard, the example processes and algorithms discussed herein can be performed by at least one processor 404, workflow database 403, and/or workflow system 406. For example, non-transitory computer readable media can be configured to store firmware, one or more application programs, and/or other software, which include instructions and other computer-readable program code portions that can be executed to control each processor (e.g., processor 404, workflow database 403, and/or workflow system 406) of the components of circuitry 400 to implement various operations, including the examples shown above. As such, a series of computer-readable program code portions are embodied in one or more computer program goods and can be used, with a computing device, server, and/or other programmable apparatus, to produce machine-implemented processes.

Figure 5:
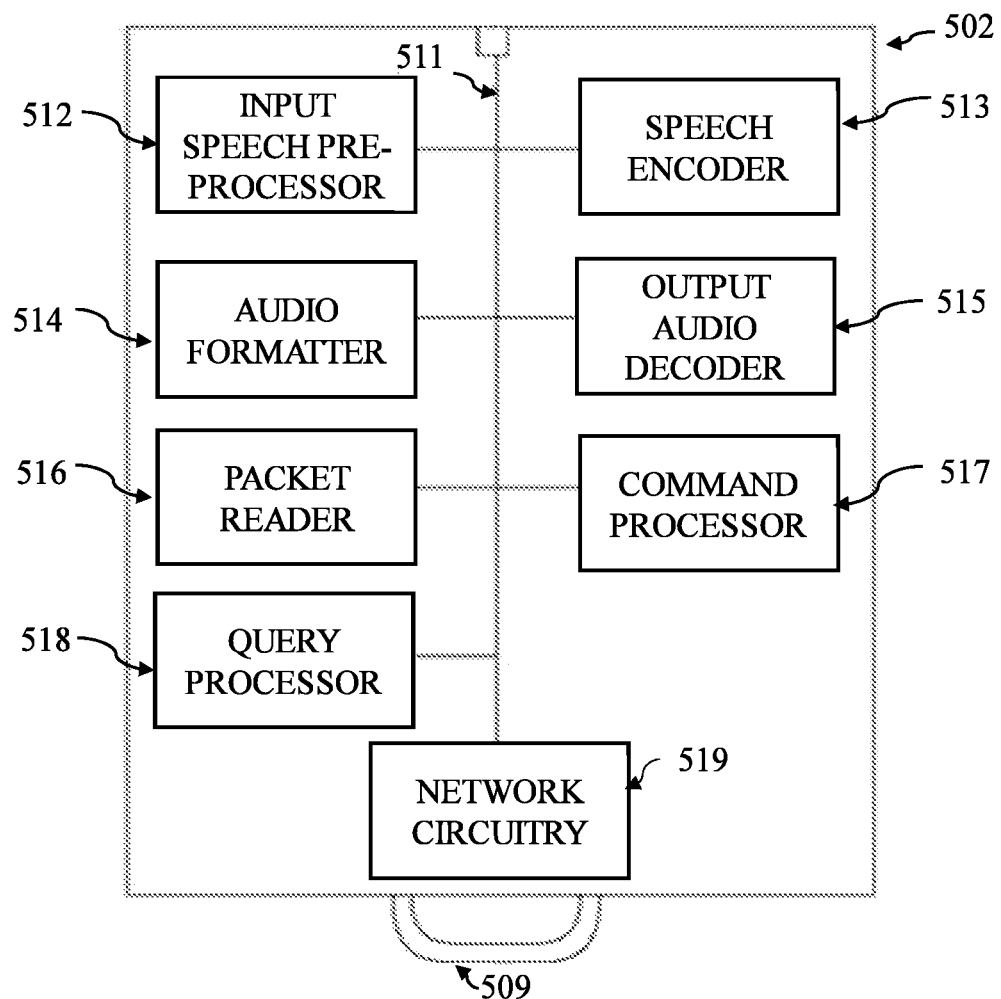
FIG. 5 illustrates a block diagram of the voice-controlled apparatus used for performing a workflow operation, in accordance with an example embodiment.

FIG. 5 illustrates an exemplary block diagram of an electronics module 502 in accordance with some embodiments of the present disclosure. The components illustrated in FIG. 5 may be in addition to one or more components of the circuitry 400 shown in FIG. 4, which may be part of the electronics module 502. In some embodiments, one or more of the components illustrated in FIG. 5 may be included in the electronics module 502 and/or other parts of the voice-controlled apparatus (200, 101), the electronic device 102, operator devices 103-103N, supervisor device 106, and/or server 105.

In the embodiment shown in FIG. 5, the electronics module 502 can include an enclosure, such as plastic case, with a connector that can mate with a complimentary mating connector (not shown) on audio cable 206 (as shown in FIG. 2). An internal path 511 can be used to communicate between multiple components within the electronics module 502 enclosure. The electronics module 502 can utilize a user-configurable attachment feature 509, such as a plastic loop and/or other suitable features, for at least partially facilitating attachment of the electronics module to the worker. In one embodiment, an input speech pre-processor (ISPP) 512 can convert input speech into pre-processed speech feature data. In some examples, an input speech encoder (ISENC) 513 can encode input speech for transmission to one or more other parts of circuitry 400 for reconstruction and playback and/or recording. Further, a raw input audio sample packet formatter 514 can transmit the raw input audio to one or more other parts of circuitry 400 using an application-layer protocol to facilitate communications between the voice terminal and headset 201 as the transport mechanism. For the purposes of the transport mechanism, the formatter 514 can be abstracted to a codec type referred to as Input Audio Sample Data (IASD). An output audio decoder (OADEC) 515 decodes encoded output speech and audio for playback in the headset 201. According to some example embodiments, a raw output audio sample packet reader 516 can operates to receive raw audio packets from one or more other parts of circuitry 400 using the transport mechanism. For the purposes of the transport mechanism, this formatter 514 can be abstracted to a codec type referred to as Output Audio Sample Data (OASD). A command processor 517 can adjusts the headset hardware (e.g., input hardware gain level) under control of one or more other parts of circuitry 400. Further, in some example embodiments, a query processor 518 can allow one or more other parts of circuitry 400 to retrieve information regarding headset operational status and configuration. Further, path 511 can also be coupled to network circuitry 519 to communicate via wired or wireless protocol with one or more other parts of circuitry 400. In some examples, the ISPP 512, ISENC 513, and raw input audio formatter 514 can be sources of communication packets used in the transport mechanism; the OADEC 515 and raw output audio reader 516 can be packet sinks. The command and query processors 517, 518 are both packet sinks as well as sources (in general they generate acknowledgement or response packets).

Figure 6:
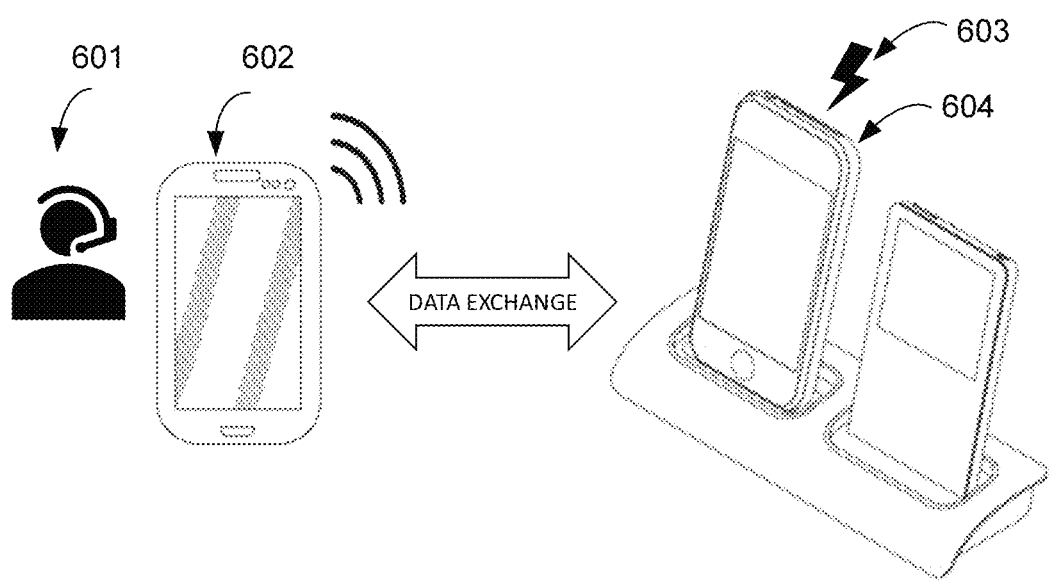
FIG. 6 illustrates an example scenario depicting a communication and data exchange between a user device and another device positioned in a charging station, in accordance with an example embodiment.

FIG. 6 illustrates an example scenario depicting a communication and data exchange between a user device 602 (e.g. a mobile device, a PDA etc.) being used by a user 601 and target device 604 positioned in a charging dock, in accordance with an example embodiment The user device 602 and the target device 604 can be communicatively coupled to each other via a Bluetooth classic connection, BLE (Bluetooth Low Energy) protocol. Various other technologies can be employed such as wireless fidelity (Wi-Fi), light fidelity (LiFi), wireless gigabit alliance (WiGig), ZigBee, Near Field Communication (NFC), magnetic secure transmission, radio frequency (RF), Ultrasound, 5G mm wave technology, etc. In accordance with an example, the user device 602 can identify the target device 604 in vicinity using NFC communication. The user device 602 on identifying the target device 604 can transfer information to the target device 604 by employing, but not limited to any of the technologies listed above. In another embodiment, the target device 604 can receive information from a server (not shown in figure) that is in communication with the target device 604 and the user device 602 over a network. The network can include any wired or wireless communication network including cellular telephone, an 802.11, 802.16, 802.20, and/or WiMax network.

In an example embodiment, an NFC module (not shown in figure) of the user device 602 can be enabled when the user 601 of the user device 602 reaches within a predetermined distance of the target device 604. The NFC module of the user device 602 can also be enabled in response an input received from the user 601 of the user device 602. In an example, the input can include but not limited to voice command, haptic touch on a screen of the user device 602 or pressing a button on the user device 602, etc. The user device 602 shown in FIG. 6 may not be limited to having display screen. The user device 602 without display screen can also be used herein.

In regard to identification of the target device 604 by the user device 602, in an example embodiment, the user 601 can identify the target device 604 in response to the target device 604 notifying 603 the user 601. The notification 603 can include, but not limited to activating a LED of the target device 604, playing a beep sound or audio tone, generating vibrations, flashing a display of the target device 604, or can also include displaying a name or identification of the user 601 for e.g. name "John" intended for the target device 604. In some examples, the user device 602 can be coupled to a voice-controlled apparatus 101 (shown in FIG. 1) to provide an audio message to the user 601 that the voice-controlled apparatus 101 is connected for the user 601, for e.g. "John" (shown in FIG. 11).

In some example embodiment, the transfer of data or exchange of data between the user device 602 and the target device 604 can take place after the target device 602 is identified as an intended device by the user device 602.

In accordance with the example embodiment, the user 601 can use the user device 602 and the voice-controlled apparatus 101 (shown in FIG. 1) to perform one or more tasks of the workflow operation. In an example embodiment, the workflow operation can be an item picking operation for picking one or more items, for example, from a storage location in the warehouse. In this regard, in an example embodiment, the user 601 can wear the voice-controlled apparatus 101 (e.g. a headset device) and receive instructions in form of voice prompts from the user device 602 to perform various steps associated with the workflow operation. For example, the user 601 can receive one or more voice prompts on the voice-controlled apparatus 101 that can include instructions (such as instructions for, reaching a storage location, identifying items to be picked, confirming the items for picking, and etc.) related to the picking of the items.

In some examples, the workflow operation being performed with the user device 602 can be paused when a battery level of the user device 602 is determined to be below a threshold value, for example, the battery level is less than 20 percent or remaining runtime of the battery is less than one hour. In an alternate embodiment, the workflow operation being performed with the user device 602 can also be paused in response to the user 601 issuing a voice command indicating that the battery level of the user device 602 is low. The threshold value for the user device 602 can be defined by a central computing system or can be user-defined. The workflow operation can be resumed in the target device 604 after the data is transferred to the target device 604 from the user device 602.

According to some alternate example embodiment, the workflow operation can be resumed in the target device 604 in response to determination that the battery level of the target device 604 is above the threshold value. The resumption of workflow operation can include user's interaction via the user device 602 or via the voice command.

Figure 7:
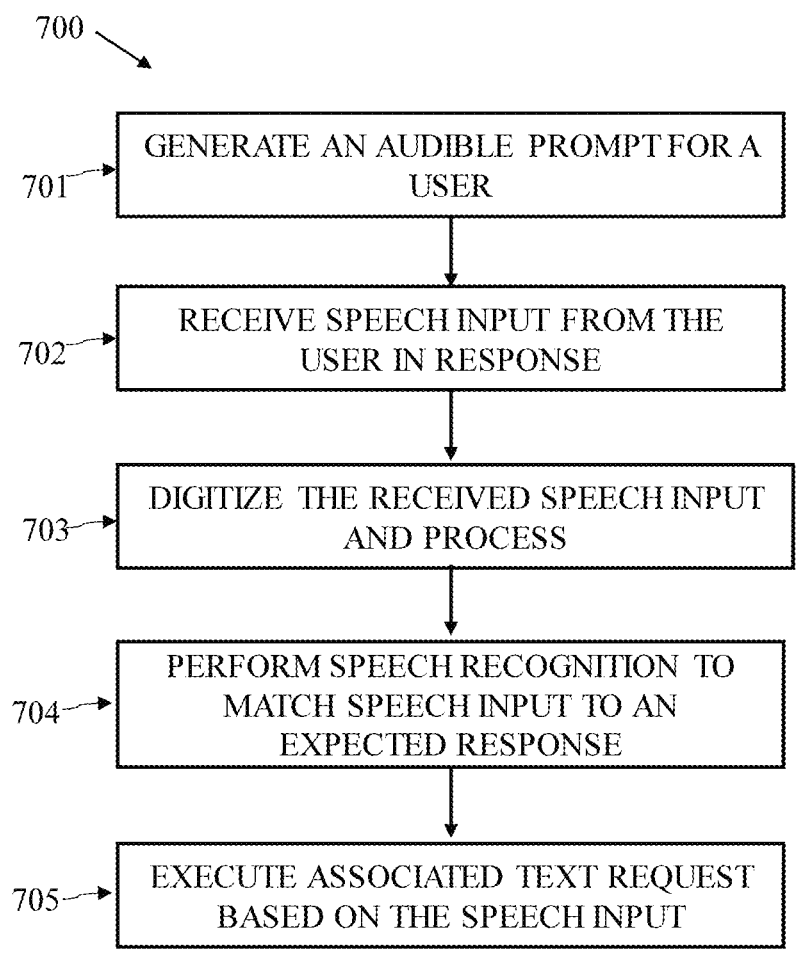
FIG. 7 shows a flowchart illustrating a method of utilizing voice-driven technology according to an example embodiment.

FIG. 7 illustrates an exemplary embodiment of a method 700 for providing voice-based communication and/or speech dialog between a user and an electronic device. The method 700 may include generating speech for a user 701. In an embodiment, the voice-controlled apparatus (for example, 200) can include output devices, such as, speakers for receiving digital instructions and/or commands from one or more components of the circuitry in the voice-controlled apparatus and output the audio transmission in the form of speech or sound.

The method 700 can further include receiving a speech input from a user in response 702. In accordance with one aspect of the present disclosure, the system can include a series of instances or junctures where an input is received from the user in response to the prompt. For example, a prompt asking a user for a desired location may request that a user provides an input, such as, speech input, providing location information, in accordance with the invention. In an example embodiment, the voice-controlled apparatus, as described above, may further include input devices, such as a microphone for receiving speech inputs from a user. The microphone may further transmit the received speech input to one or more components of circuitry in the voice controllable device for further processing and recognition.

The method 700 can include digitizing the received speech input and processing digitized speech 703. In accordance with one aspect of the present disclosure, a microphone or other electro-acoustical components of the voice-controlled apparatus may receive a speech input from a user and may convert the speech input into an analog voltage signal.

The method 700 can further include performing speech recognition to match speech input to an expected response 704. In accordance with one aspect of the present disclosure, a speech recognition search algorithm function, realized by an appropriate circuit and/or software in the voice controllable device may analyze the features, as described above, to determine what hypothesis to assign to the speech input captured by the microphone of the voice-controlled apparatus. As is known in the art, in one recognition algorithm, the recognition search relies on probabilistic models provided through a database of suitable models to recognize the speech input. Each of the models in the database may either be customized to a user or be generic to a set of users.

Hidden Markov Models (HMM) may be used for the speech recognition. In speech recognition, these models may use sequences of states to describe vocabulary items, which may be words, phrases, or sub word units. As used herein, the term "word" may refer to a vocabulary item, and thus may mean a word, a segment or part of a word, or a compound word, such as "next slot" or "say again." Therefore, the term "word" may not be limited to just a single word. Each state in an HMM may represent one or more acoustic events and may serve to assign a probability to each observed feature vector. Accordingly, a path through the HMM states may produce a probabilistic indication of a series of acoustic feature vectors. The model may be searched such that different, competing hypotheses (or paths) are scored; a process known as acoustic matching or acoustic searching. A state S may be reached at a time T via a number of different paths. For each path reaching a particular state at a particular time, a path probability may be calculated. Using the Viterbi algorithm, each path through the HMM may be assigned a probability. In particular, the best path may be assigned a probability. Furthermore, each word in the best path may be assigned a probability. Each of these probabilities may be used as a confidence factor or combined with other measurements, estimates or numbers to derive a confidence factor. The path with the highest confidence factor, the best hypothesis, can then be further analyzed.

When in operation, the search algorithm (which can be implemented using Hidden Markov Models with a Viterbi algorithm or other modeling techniques such as template matching dynamic time warping (DTW) or neural networks), in essence, may compare the features generated, as described above, with reference representations of speech, or speech models, in the database in order to determine the word or words that best match the speech input from the user device. In an embodiment, part of this recognition process may be to assign a confidence factor for the speech to indicate how closely the sequence of features from the search algorithm matches the closest or best-matching models in the database. As such, a hypothesis consisting of one or more vocabulary items and associated confidence factors may be directed to an acceptance algorithm to determine expected response. In accordance with the above embodiment, if the confidence factor is above a predetermined acceptance threshold, then the acceptance algorithm may decide to accept the hypothesis as recognized speech. If, however, the confidence factor is not above the acceptance threshold, as utilized by the acceptance algorithm, then the acceptance algorithm may decide to ignore or reject the recognized speech. The user device may then prompt the user to repeat the speech input. In this instance, the user may repeat the audio input provided to the microphone.

The method 700 may further include executing the text request associated with the speech input 705. That is, a text request may be associated with the recognized speech and then acted upon after processing the speech input.

Figure 8:
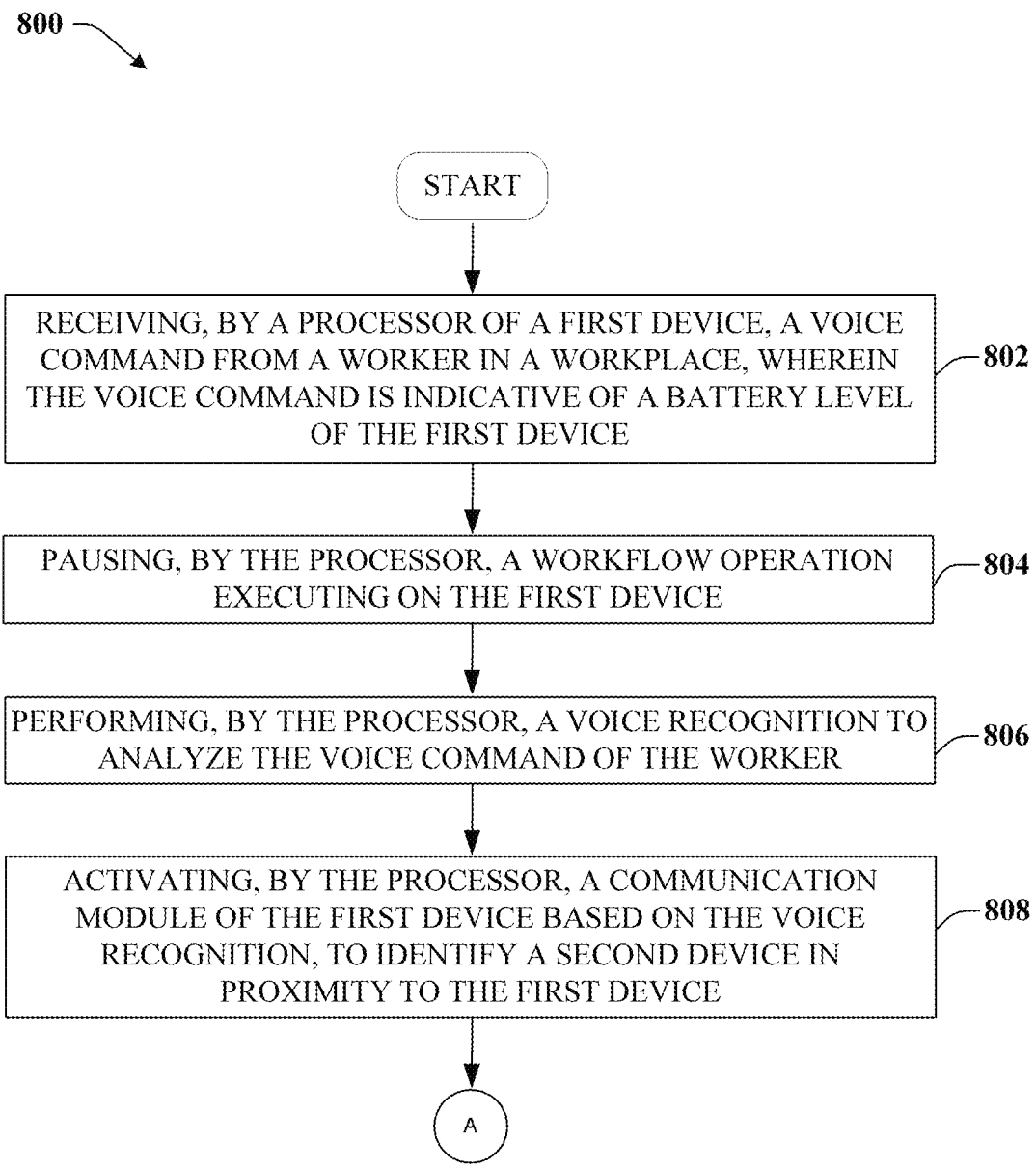
FIGS. 8-9 illustrate a flow diagram representing a method of identifying a second device by a first device for establishing a communication between the first device and the second device so as to facilitate swapping between the first device and the second device, in accordance with another example embodiment described herein.
Figure 9:
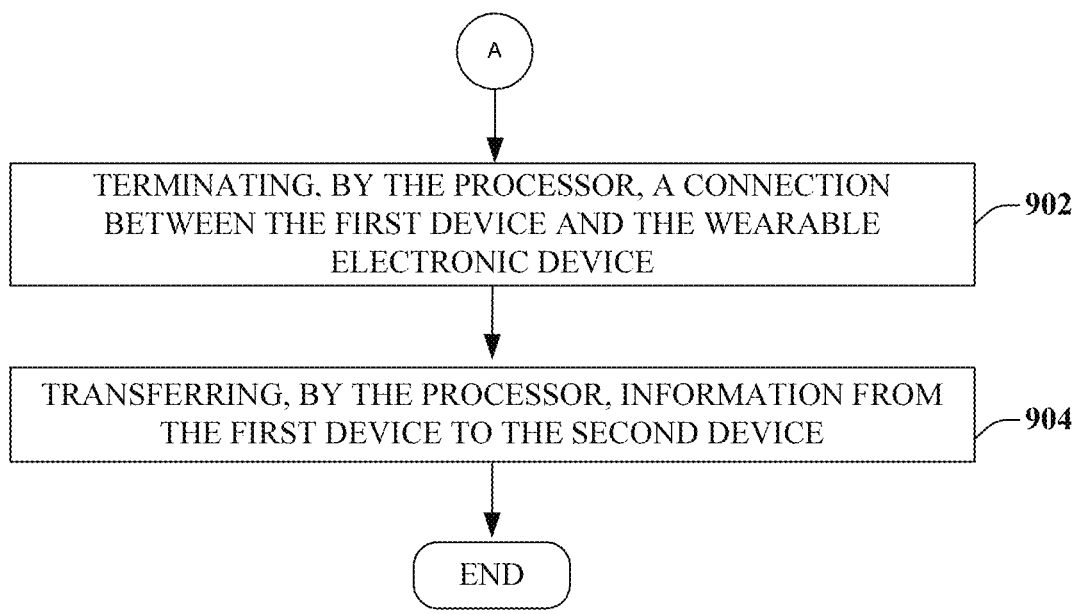

FIGS. 8-9 illustrates a flow diagram representing a method 800 of identifying a second device by a first device for establishing a communication between the first device and the second device so as to facilitate swapping between the first device and the second device, in accordance with an example embodiment.

At step 802, a first device (e.g. the user device 602) can receive a voice command from a worker in a workplace, the voice command can be indicative of a battery level of the first device. In this regard, as described earlier, the worker performing the workflow operation with the mobile device can issue a voice command indicating that the battery level of the mobile device.

At step 804, the first device can pause the workflow operation executing on the first device. In an example, as described in FIG. 6, the on-going workflow execution can be paused in response to the user 601 issuing a voice command indicating that the battery level of the user device 602 is low.

At step 806, the first device can perform a voice recognition to analyze the voice command of the worker. In this regard, as described earlier in FIG. 7, the speech recognition can be performed to match speech input to an expected response.

The method at step 808 illustrates that the first device can activate a communication module based on the voice recognition, to identify a second device in proximity to the first device. As described earlier in FIG. 6, the communication module here can be an NFC module of the user device 602 that can be enabled in response to an input received from the user 601 of the user device 602. The target device 604 (herein referred to as second device) can be identified by the NFC module of the user device 602 (herein referred as first device). In an example, the input can include but not limited to the voice command issued by the user 601.

At step 902, the first device can terminate a connection with the wearable electronic device. According to some example embodiments, the wearable electronic device (e.g. the voice-controlled apparatus 101) can connect with the first device or the second device via a Bluetooth classic connection, BLE (Bluetooth Low Energy) protocol. Various other technologies can be employed here such as wireless fidelity (Wi-Fi), light fidelity (LiFi), wireless gigabit alliance (WiGig), ZigBee, Near Field Communication (NFC), magnetic secure transmission, radio frequency (RF), Ultrasound, 5G mm wave technology, etc. In an alternate embodiment, the first device can be connected simultaneously with multiple peripheral device such as headsets, scanners, pocket printers, PDTs, terminal devices using any of the above listed technologies.

At step 904, the first device can transfer information to the second device. The information can include but not limited to user voice templates, tasks related information, configuration information and another connected devices information.

The method 900 stops after step 904. In one or another embodiment, the above steps can be performed between the first device and the second device, without using any peripheral device, i.e. without the wearable electronic device.

Figure 10:
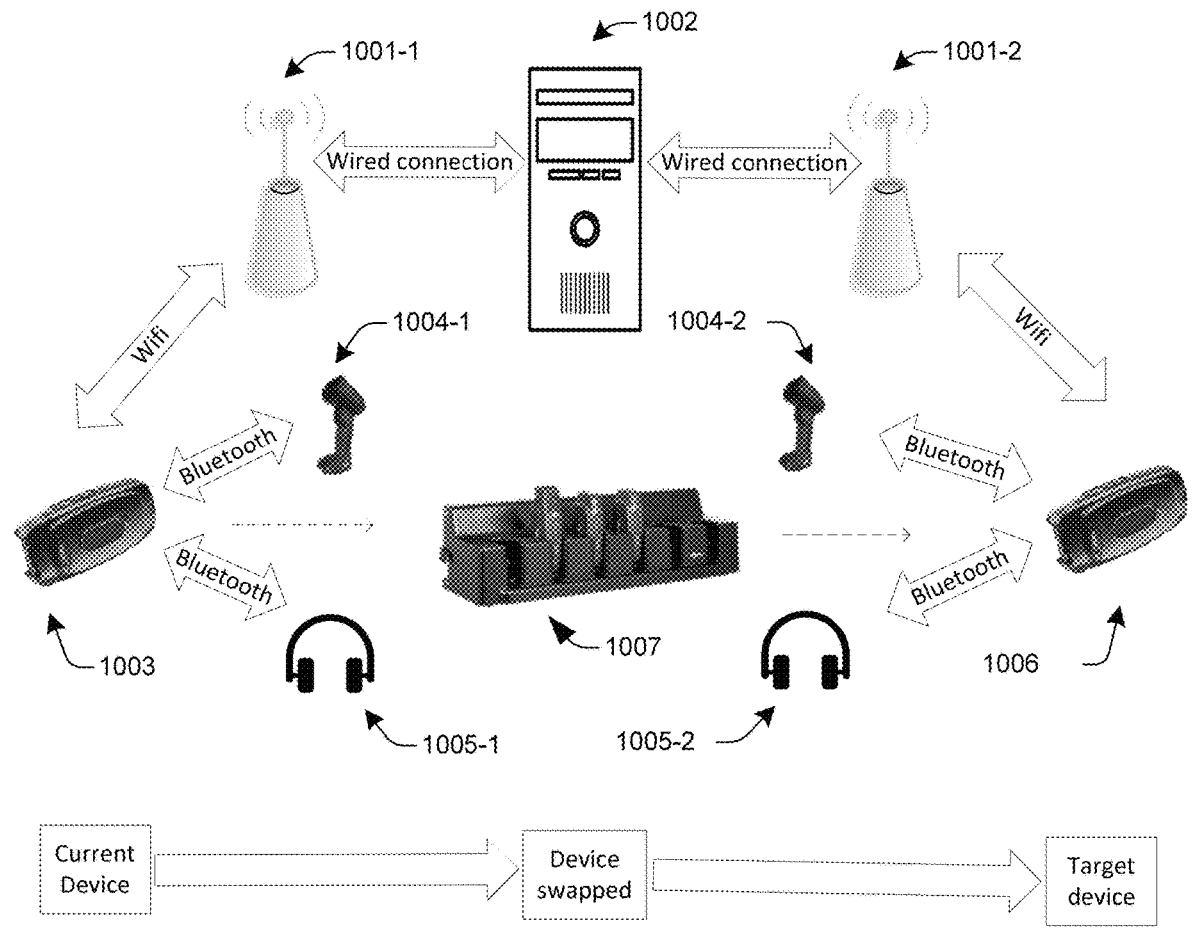
FIG. 10 illustrates an example scenario depicting swapping between a first electronic device (without screen) and a second electronic device (without screen), in accordance with an example embodiment.

FIG. 10 illustrates an example scenario depicting swapping between a first electronic device and a second electronic device, in accordance with an example embodiment. The example scenario can include access points 1001-1 and 1001-2 or a gateway device that can be capable of communicating directly with one or more electronic devices (say, a first electronic device 1003 and a second electronic device 1006) and can also be capable of communicating (either directly or alternatively indirectly via a communication network such as the Internet or via a server) with a network establishment service (e.g. Internet service provider). The access points 1001-1 and 1001-2, in FIG. 10, can communicate with the electronic devices (the first electronic device 1003 and the second electronic device 1006) via a Wi-Fi. Various other technologies can be employed here such as light fidelity (LiFi), wireless gigabit alliance (WiGig), ZigBee, Near Field Communication (NFC), magnetic secure transmission, radio frequency (RF), Ultrasound, 5G mm wave technology, etc. The access points 1001-1 and 1001-2, in FIG. 10, can be directly coupled to a WMS (Workflow management system) 1002 via a wired connection.

The first electronic device 1003 and the second electronic device 1006 can communicate with a first headset 1005-1 and a second headset 1005-2 respectively via Bluetooth connection. Also, the first electronic device 1003 and the second electronic device 1006 can communicate with a first reader 1004-1 and a second reader 1004-2 respectively via the Bluetooth connection. As mentioned earlier, the first electronic device 1003 and the second electronic device 1006 can be connected simultaneously with multiple peripheral device such as headsets, scanners, pocket printers, PDTs, terminal devices using but not limited to BLE, wireless fidelity (Wi-Fi), light fidelity (LiFi), wireless gigabit alliance (WiGig), ZigBee, Near Field Communication (NFC), magnetic secure transmission, radio frequency (RF), Ultrasound, 5G mm wave technology, etc.

In one embodiment, a user may carry the first electronic device 1003 that can be connected to the first headset 1005-1 to perform workflow operation. The user performing the workflow operation, for example, picking operation in a warehouse may notice a battery level indicator of the first electronic device 1003 indicating that the battery of the first electronic device is about to drain. The user speaks a voice command corresponding to lower battery state of the first electronic device 1003. The user can then travel to a charging station 1007 having plurality of charged electronic devices to pick the second electronic device 1006 in fully charged state. This enables the user to swap the first electronic device 1003 with the second device 1006 for performing the workflow operation. A speech recognizer (as described in FIG. 3) of the first electronic device 1003 can perform a voice recognition to analyze the voice command of the user. In an alternate embodiment, the voice recognition of the voice command can be performed on the first headset 1005-1 (as described earlier in FIG. 2, the voice-controlled apparatus 200 can correspond to a headset that can include a wireless enabled voice recognition device). In this regard, the workflow operation being performed in the first electronic device 1003 can be paused. A point at which the workflow operation paused can be stored temporarily in a stack memory of the first electronic device 1003.

Based on analyzing the voice command of the user, a communication module, for example but not limited to an NFC module (not shown in figures) associated with the first electronic device 1003 can be activated to identify a target device. The target device herein referred to the second electronic device 1006. The target device can be a device that is positioned in the charging station or a charging dock 1007. The charging station 1007 can include plurality of devices that are either completely charged or being in process of charging. In an alternate embodiment, the user can reach to the charging station 1007 and then manually activate the NFC module of the first electronic device 1003 to identify the target device. The manual activation can include either pressing a button on the first electronic device 1003 or provide a speech input to turn ON the NFC module. In another exemplary embodiment, the NFC module of the first electronic device 1003 can be automatically activated for identification of the target device, in response to the user of the first electronic device 1003 reaching within a predefined distance of the target device, i.e. the second electronic device 1006. In some examples, the second electronic device 1006 can be identified as the target device when a LED light of the second electronic device 1006 starts blinking. The blinking of the LED starts when the first electronic device 1003 reaches within the predefined distance of the second electronic device 1006. The blinking of the LED can also be initiated in response to the user pressing the button of the first electronic device 1003. In an alternate embodiment, the blinking of the LED can also be initiated in response to the first electronic device 1003 reaching within the predefined distance of the second electronic device 1006 and the button on the first electronic device 1003 being pressed.

In yet another exemplary embodiment, the first electronic device 1003 and the second electronic device 1006 can be connected for data transfer by placing the first electronic device 1003 over the second electronic device 1006 in proper alignment. For example, a bottom surface of the first electronic device 1003 can be placed over a top surface of the second electronic device 1006 or vice-versa to connect both the devices for data transfer. The successful connection of both the first electronic device 1003 and the second electronic device 1006 can be indicated based on LEDs of both the first electronic device 1003 and the second electronic device 1006 flashing in synchronization. In another example embodiment, the process of connecting the devices can include activating the first electronic device 1003 in sender mode and the second electronic device 1006 in receiver mode by pressing buttons on the first electronic device 1003 and the second electronic device 1006.

Once the NFC module of the first electronic device 1003 is enabled, all the connections of the first electronic devices 1003 with peripheral devices, for example, the first headset 1005-1 and the first reader 1004-1 can be terminated. In this regard, the first electronic device 1003 can then initiate transfer of information from the first electronic device 1003 to the second electronic device 1006 via a Wi-Fi network. Various other technologies can be employed here such as light fidelity (LiFi), wireless gigabit alliance (WiGig), Zig-Bee, Near Field Communication (NFC), magnetic secure transmission, radio frequency (RF), Ultrasound, 5G mm wave technology, etc.

In an example embodiment, the information can be stored on the WMS 1002 by the first electronic device 1003. The second electronic device 1006 can send a request to the WMS 1002 via the access point 1001-2 to provide the information required for performing the workflow operation. In response to the request, the WMS 1002 can provide the information to the second electronic device 1006. According to some example, the information can be downloaded directly by the second electronic device 1006 from the WMS 1002. The information can include but not limited to user voice templates, tasks related information, configuration information and another connected devices information.

The second electronic device 1006 can then establish connections with the peripheral devices such as the second headset 1005-2 and the second reader 1004-2. In an example embodiment, the second electronic device 1006 can establish connections with the first headset 1005-1 and the first reader 1004-1 to resume the workflow operation. This facilitates the user of the second electronic device 1006 to use same peripheral devices (i.e., the first headset 1005-1 and the first reader 1004-1) that were being used earlier with the first electronic device 1003 before the swapping. In some examples, the connection between the second electronic device 1006 and the peripheral devices can also be established when surfaces of the second electronic device 1006 and the peripheral devices touch each other for a period of time. For example, the second electronic device 1006 can be tapped against the second headset 1005-2 to establish the connection between them. This can be applied to the first electronic device 1003 and its peripheral devices as well.

The successful swapping of the first electronic device 1003 to the second electronic device 1006 can be notified to the user by playing an audio message to the user. For example, the second headset 1005-2 connected to the second electronic device 1006 can play the message "Headset Connected for operator John". In response, the user can confirm the swapping indicating that he is an intended user for the second electronic device 1006 to perform the workflow operation.

The workflow operation can be resumed in the second electronic device 1006 from the point it was terminated and stored in the stack memory. In an example embodiment, the workflow operation can also be resumed by issuing commands to the second electronic device 1006 from the WMS 1002.

Figure 11:
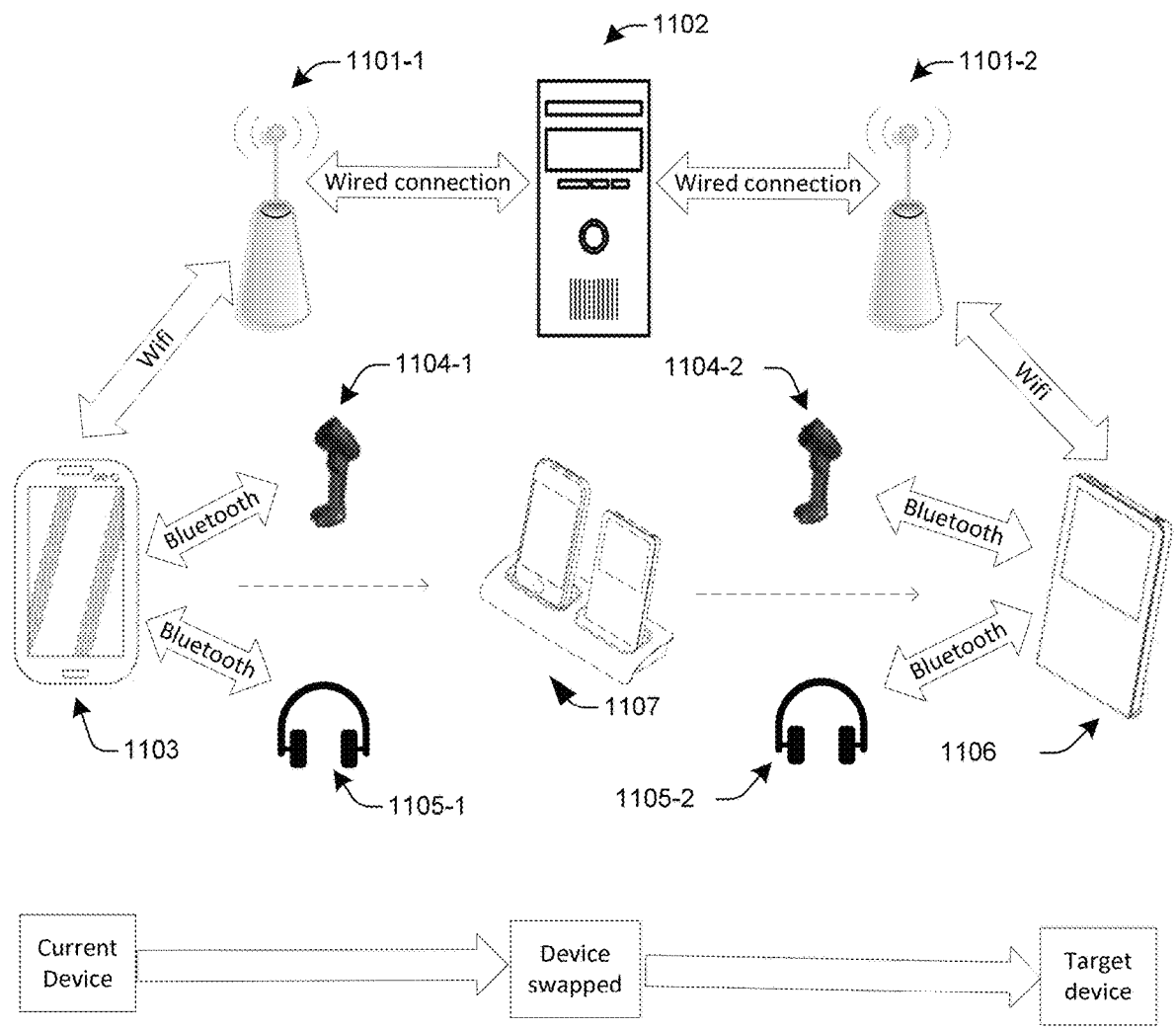
FIG. 11 illustrates an example scenario depicting swapping between a first electronic device (with screen) and a second electronic device (with screen), in accordance with an example embodiment.

FIG. 11 illustrates another example scenario depicting swapping between a first electronic device and a second electronic device, in accordance with an example embodiment. The example scenario can include access points 1101-1 and 1101-2 or a gateway device that can be capable of communicating directly with one or more electronic devices (say, a first electronic device 1103 and a second electronic device 1106) and can also be capable of communicating (either directly or alternatively indirectly via a communication network such as the Internet or via a server) with a network establishment service (e.g. Internet service provider). The access points 1101-1 and 1101-2, in FIG. 11, can communicate with the electronic devices (the first electronic device 1103 and the second electronic device 1106) via a Wi-Fi network. Various other technologies can be employed here such as light fidelity (LiFi), wireless gigabit alliance (WiGig), ZigBee, Near Field Communication (NFC), magnetic secure transmission, radio frequency (RF), Ultrasound, 5G mm wave technology, etc. As explained earlier in FIG. 10, the access points 1101-1 and 1101-2, can be directly coupled to a WMS (Workflow management system) via a wired connection.

The first electronic device 1103 and the second electronic device 1106 can communicate with a first headset 1105-1 and a second headset 1105-2 respectively via a Bluetooth connection. Also, the first electronic device 1103 and the second electronic device 1106 can communicate with a first reader 1104-1 and a second reader 1104-2 respectively via the Bluetooth connection. As mentioned earlier, the first electronic device 1103 and the second electronic device 1106 can be connected simultaneously with multiple peripheral device such as headsets, scanners, pocket printers, PDTs, terminal devices using but not limited to BLE, wireless fidelity (Wi-Fi), light fidelity (LiFi), wireless gigabit alliance (WiGig), ZigBee, Near Field Communication (NFC), magnetic secure transmission, radio frequency (RF), Ultrasound, 5G mm wave technology, a wired ethernet network etc.

In an example, a user can carry the first electronic device 1103 to perform a workflow operation, e.g. perform a pick task in a warehouse. The first electronic device 1103 can be connected to peripheral devices such as the first headset 1105-1 and the first reader 1104-1 while performing the workflow operation. As already explained in detailed description, the WMS 1102 can monitor battery levels of all the electronic devices (for example, the first electronic device 1103, the second electronic device 1106, and other electronic device placed in a charging dock 1107) being used by workers for performing the workflow operations. The WMS 1102 can directly communicate to each of the electronic devices through a combination of a wired network and a wireless network. In another example, the WMS 1102 can communicate with the electronic devices via the access points 1101-1 and 1101-2.

In an exemplary embodiment, the WMS 1102 can direct the first electronic device 1103 to perform a set of tasks through a plurality of commands. The commands can be, but not limited to voice commands to the user of the first electronic device 1103 via the first headset 1105-1. In response, the user can send voice response back to the WMS 1102 as a part of the workflow operation. For example, the WMS 1102 can issue a command to "Go to Location A, Aisle 8, Slot 2". The user after reaching to a location can send the voice response "Ok. Reached Location A, Aisle 8, Slot 2".

The WMS 1102 can determine that a battery level of the first electronic device 1103 is low or about to drain soon. In some scenarios, the battery level determination can be done by the first electronic device 1103 itself. The WMS 1102 can then send a notification to the first electronic device 1103 informing to the user of the first electronic device 1103 that the battery is below a predefined threshold value. The predefined threshold value can be, for example, but not limited to the battery level less than 20 percent or remaining runtime of the battery is less than one hour. The predefined threshold value can be defined by the WMS 1102 or can be user-defined. The predefined threshold value can be determined by the WMS 1102 based on at least one of a type of a task being performed by the user, a priority level of the task allocated to the user, or a predefined break duration of the user. The notification to the first electronic device 1103 can be, but not limited to an audio alert, a visual alert, or a warning message on the first electronic device 1103. In some cases, the user of the first electronic device 1103 can be asked to provide either an acceptance or a rejection to the notification. The user can accept or reject the notification by giving a voice input "Accept/Reject" or by touching on ACCEPT option being displayed on a display screen of the first electronic device 1103. The user can also delay swapping process by selecting REJECT option in the display screen.

Once the user confirms that the swapping of devices is needed, the WMS 1102 can then determine based on a current location of the first electronic device 1103, a list of devices in the charging dock 1107 available for swapping. The charging station 1007 can include plurality of devices that are either completely charged or being in process of charging. The WMS 1102 can then select a target device (herein referred as, the second electronic device 1106) from the charging dock 1107. In an embodiment, the WMS 1102 can send instructions to first electronic device 1103 to reach to the target device i.e., the second electronic device 1106. The instructions can comprise a location information of the second electronic device 1106, a shortest route information to reach to the second electronic device 1106. The instructions can be given either visually or vocally. In an example, the shortest route information may comprise a map displayed on the display screen of the first electronic device 1103. The user of the first electronic device 1103 can use the map to reach to the second electronic device 1106 for swapping the first electronic device 1103 with the second electronic device 1106.

Meanwhile, the WMS 1102 can prepare the second electronic device 1106 for swapping by sending information to the second electronic device 1106. The information can be stored on the WMS 1102 by the first electronic device 1103. According to some example, the information can be downloaded directly by the second electronic device 1106 from the WMS 1102. In some cases, the information can be transferred from the first electronic device 1103 to the second electronic device 1106 when the first electronic device 1103 reaches in proximity of the second electronic device 1106. The information can include but not limited to user voice templates, tasks related information, configuration information and another connected devices information.

The user of the first electronic device 1103 follows the given commands to reaches to the charging dock 1107 to pick up the second electronic device 1106 selected as a swapping device. The user can identify the second electronic device 1106 in the charging dock 1107 by reading a text flashing on a screen of the second electronic device 1106. With regards to FIG. 11, suppose a user named "John" of the first electronic device 1103 reaches to the charging dock 1107, the second electronic device 1106 selected for swapping by the WMS 1102 may display "John" in a screen of the second electronic device 1106. In this way, the user can identify the second electronic device 1106 in the charging dock 1107. The screen of the second electronic device 1106, in an example, may continue to display the name of the user for a period of time or until the user picks up the second electronic device 1106 from the charging dock 1107. In an alternate embodiment, the second electronic device 1106 may initiate flashing the name of the user of the first electronic device 1103 in response to the user of the first electronic device 1103 reaching within a predefined distance of the target device, i.e. the second electronic device 1106. The flashing of the name of the user on the screen of the second electronic device 1106 can also be initiated in response to the user pressing a button of the first electronic device 1103.

Once the user reaches to the charging dock 1107 or near the second electronic device 1106, all the connections of the first electronic devices 1103 with peripheral devices, for example, the first headset 1105-1 and the first reader 1104-1 can be terminated. In this regard, the first electronic device 1103 can then initiate transfer of information from the first electronic device 1103 to the second electronic device 1106 via a Wi-Fi network. Various other technologies can be employed here such as light fidelity (LiFi), wireless gigabit alliance (WiGig), ZigBee, Near Field Communication (NFC), magnetic secure transmission, radio frequency (RF), Ultrasound, 5G mm wave technology, etc.

In some examples, the first electronic device 1103 and the second electronic device 1106 can be connected for data transfer by placing the first electronic device 1103 over the second electronic device 1106 in proper alignment.

In an exemplary embodiment, the user can then pickup the second electronic device 1106 from the charging dock 1107 for performing the workflow operation. The user can also the place the first electronic device 1103 in the charging dock 1107 for charging. Once the user picks up the second electronic device 1106, he can be asked via a visual message to confirm that the second electronic device 1106 is the correct and intended device for swapping. The user then can provide confirmation by any one of: a voice input, entering a password or unique login ID, providing biometric information, pressing a confirm button on the screen of the second electronic device 1106, or selecting a confirm option. Based on the confirmation, the second electronic device 1106 can be verified as the intended device for swapping and performing the workflow operation.

The second electronic device 1106 can then establish connections with peripheral devices such as a second headset 1105-2 and a second reader 1104-2. In an example embodiment, the second electronic device 1106 can establish connections with the first headset 1105-1 and the first reader 1104-1 to resume the workflow operation. This facilitates the user of the second electronic device 1106 to use same peripheral devices (i.e., the first headset 1105-1 and the first reader 1104-1) that were being used earlier with the first electronic device 1103 before the swapping. There might be no need to change to the new peripheral devices (i.e. the second headset 1105-2 and the second reader 1104-2) to perform the workflow operation. In some example, the second electronic device 1106 can be tapped against the peripheral devices (the second headset 1105-2 and the second reader 1104-2) for a period of time to establish the connection between them. This can be applied to the first electronic device 1103 and its peripheral devices as well.

The successful swapping of the first electronic device 1103 to the second electronic device 1106 can be notified to the user by playing an audio message to the user. For example, the second headset 1105-2 connected to the second electronic device 1106 can play the message "Headset Connected for operator John". In response, the user can confirm the swapping indicating that he is an intended user for the second electronic device 1106 to perform the workflow operation. The connection of other peripheral devices such as the second reader 1104-2 with the second electronic device 1106 can be confirmed in response to the second reader 1104-2 flashing an LED associated with the second reader 1104-2. The flashing of the LED indicates that the second reader is a correct peripheral device for the second electronic device 1106. In an example embodiment, the flashing of the LED can be initiated in response to the user of the second electronic device 1106 issuing a voice command or providing a gesture, for example, "what are the peripheral devices for John". The voice command can be recognized, and all the peripheral devices connected with the second electronic device 1106 can start generating alert, for example, blinking LED, playing audio beep, or vibrating. This enables the user to identify the peripheral devices connected with the second electronic device 1106.

The workflow operation can be resumed in the second electronic device 1106 from the point it was terminated and stored in the stack memory. In an example embodiment, the workflow operation can be resumed by issuing commands to the second electronic device 1106 from the WMS 1102.

Figure 12:
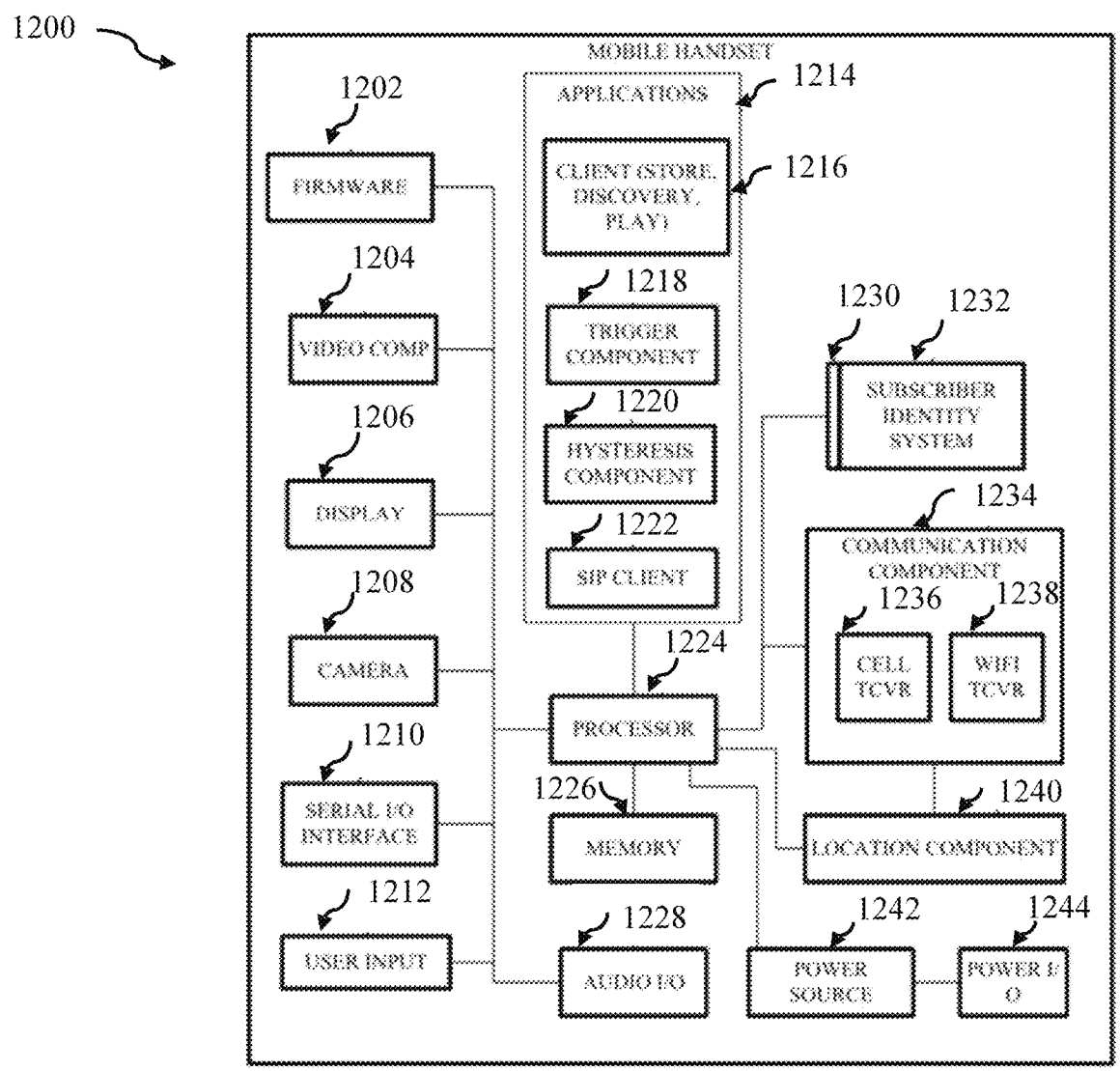
FIG. 12 illustrates a schematic view of an example electronic device used for performing a workflow operation, in accordance with an example embodiment.

FIG. 12 illustrates a schematic view 1200 of an example electronic device (e.g. the electronic device 102, the operator devices 103-103N, the supervisor device 106 etc.), in accordance with an example embodiment described herein. In some example embodiments, the electronic device 102 can correspond to a mobile handset. FIG. 12 illustrates is a schematic block diagram of an example end-user device such as a user equipment that can be the electronic device 102 used by an operator for executing one or more tasks of a workflow.

Although, FIG. 12 illustrates a mobile handset, it will be understood that other devices can be any electronic device as described in FIG. 1, and that the mobile handset is merely illustrated to provide context for the embodiments of the various embodiments described herein. To this end, the following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., described herein in accordance with example embodiments, that can perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

According to some example embodiments, the electronic device 102, the operator devices 103-103N, and the voice-controlled apparatus 101 can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

According to some example embodiments described herein, a communication media typically embodies computer-readable instructions, data structures, program modules or other data in a modulated data signal such as a carrier wave or other transport mechanism and includes any information delivery media. In this regard, the term "modulated data signal" can correspond to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

According to some example embodiments, the mobile handset can comprise a processor 1224 for controlling and processing all onboard operations and functions. A memory 1226 interfaces to the processor 1224 for storage of data and one or more applications 1214 (e.g., a video player software, user feedback component software, etc.). Other applications can include voice recognition of predetermined voice commands that facilitate initiation of the user feedback signals. The applications 1214 can be stored in the memory 1226 and/or in a firmware 1202 and executed by the processor 1224 from either or both the memory 1226 or/and the firmware 1202. The firmware 1202 can also store startup code for execution in initializing the mobile handset. A communications component 1234 interfaces to the processor 1224 to facilitate wired/wireless communication with external systems, e.g., cellular networks, VoIP networks, and so on. Here, the communications component 1234 can also include a suitable cellular transceiver 1236 (e.g., a GSM transceiver) and/or an unlicensed transceiver 1238 (e.g., Wi-Fi, WiMAX) for corresponding signal communications. The mobile handset can be a device such as a cellular telephone, a PDA with mobile communications capabilities, and messaging-centric devices. The communications component 1234 also facilitates communications reception from terrestrial radio networks (e.g., broadcast), digital satellite radio networks, and Internet-based radio services networks.

The mobile handset can also comprise a display 1206 (e.g. display screen) for displaying text, images, video, telephony functions (e.g., a Caller ID function), setup functions, and for user input. For example, the display 1206 can also be referred to as a "screen" that can accommodate the presentation of multimedia content (e.g., music metadata, messages, wallpaper, graphics, etc.). The display 1206 can also display videos and can facilitate the generation, editing and sharing of video quotes. A serial I/O interface 1210 is provided in communication with the processor 1224 to facilitate wired and/or wireless serial communications (e.g., USB, and/or IEEE 1384) through a hardwire connection, and other serial input devices (e.g., a keyboard, keypad, and mouse). This support updating and troubleshooting the mobile handset, for example. Audio capabilities are provided with an audio I/O component 1228, which can include a speaker for the output of audio signals related to, for example, indication that the user pressed the proper key or key combination to initiate the user feedback signal. The audio I/O component 1228 also facilitates the input of audio signals through a microphone to record data and/or telephony voice data, and for inputting voice signals for telephone conversations.

The mobile handset can also comprise a slot interface 1230 for accommodating a SIC (Subscriber Identity Component) in the form factor of a card Subscriber Identity Module (SIM) or universal SIM 1232 and interfacing the SIM card 1232 with the processor 1224. However, it is to be appreciated that the SIM card 1232 can be manufactured into the mobile handset and updated by downloading data and software.

The mobile handset can also process IP data traffic through the communication component 1234 to accommodate IP traffic from an IP network such as, for example, the Internet, a corporate intranet, a home network, a person area network, etc., through an ISP or broadband cable provider. Thus, VoIP traffic can be utilized by the mobile handset and IP-based multimedia content can be received in either an encoded or decoded format.

A video processing component 1208 (e.g., a camera) can be provided for decoding encoded multimedia content. The video processing component 1208 can aid in facilitating the generation, editing, and sharing of video quotes. The mobile handset also includes a power source 1242 in the form of batteries and/or an AC power subsystem, which power source 1242 can interface to an external power system or charging equipment (not shown) by a power I/O component 1244.

According to some example embodiments, the mobile handset can also comprise a video component 1204 for processing video content received and, for recording and transmitting video content. For example, the video component 1204 can facilitate the generation, editing and sharing of video quotes. In some example embodiments, a location tracking component 1240 facilitates geographically locating the mobile handset. As described hereinabove, this can occur when the user initiates the feedback signal automatically or manually. According to some example embodiments, a user input component 1212 facilitates the user initiating the quality feedback signal. In this regard, in some examples, the user input component 1212 can also facilitate the generation, editing and sharing of video quotes. According to various example embodiments described herein, the user input component 1212 can include such conventional input device technologies such as a keypad, keyboard, mouse, stylus pen, and/or touch screen, for example.

Referring again to the applications 1214, a hysteresis component 1220 can facilitate the analysis and processing of hysteresis data, which is utilized to determine when to associate with the access point. A software trigger component 1218 can be provided that facilitates triggering of the hysteresis component 1220 when the Wi-Fi transceiver 1238 detects the beacon of the access point. A SIP client 1222 enables the mobile handset to support SIP protocols and register the subscriber with the SIP registrar server. In some example embodiments, the applications 1214 can also include a client 1216 that provides at least the capability of discovery, play and store of multimedia content, for example, music.

In some example embodiments, the mobile handset, as indicated above related to the communications component 1234, includes an indoor network radio transceiver 1238 (e.g., Wi-Fi transceiver). This function can support the indoor radio link, such as IEEE 802.11, for the dual-mode GSM handset. In some example embodiments, the mobile handset can accommodate at least satellite radio services through a handset that can combine wireless voice and digital radio chipsets into a single handheld device.

Figure 13:
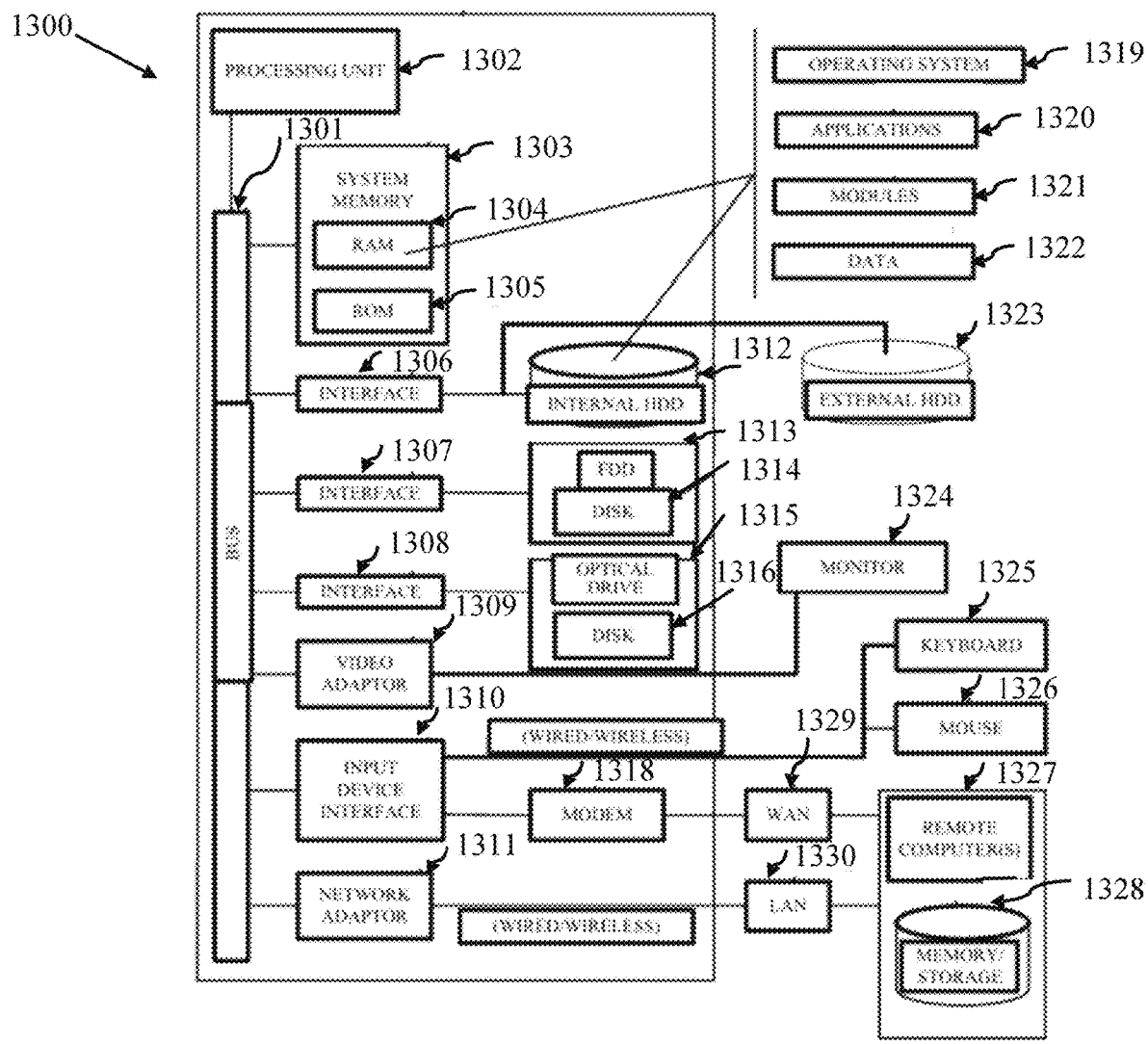
FIG. 13 illustrates a schematic view of another example electronic device used for performing a workflow operation, in accordance with another example embodiment.

FIG. 13 illustrates a schematic view of another example of an electronic device 1300, in accordance with another example embodiment described herein. According to some example embodiments, the electronic device 1300 illustrated in FIG. 13 can correspond to the electronic device 102, the operator devices 103-103N, the supervisor device 106, and/or the server 105, as described in reference to FIGS. 1-12.

Referring now to FIG. 13, there is illustrated a block diagram of operable to execute the functions and operations performed in the described example embodiments. In some example embodiments, the electronic device 1300 can provide networking and communication capabilities between a wired or wireless communication network and a server and/or communication device. In order to provide additional context for various aspects thereof, FIG. 13 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein with regards to the end-user device can comprise the electronic device (or referred as computing device 1300) comprising a processing unit 1302, a system memory 1303 and a system bus 1301. The system bus 1301 can be configured to couple system components including, but not limited to, the system memory 1303 to the processing unit 1302. In some example embodiments, the processing unit 1302 can be any of various commercially available processors. To this end, in some examples, dual microprocessors and other multi-processor architectures can also be employed as the processing unit 1302.

According to some example embodiments, the system bus 1301 can be any of several types of bus structure that can further interconnect to a memory bus (with or without a memory controller), a peripheral bus, and a local bus using any of a variety of commercially available bus architectures. In some examples, the system memory 1303 can comprise, read-only memory (ROM) 1305 and random-access memory (RAM) 1304. According to some example embodiments, a basic input/output system (BIOS) is stored in a non-volatile memory 1305 such as ROM, EPROM, EEPROM, which BIOS contains the basic routines that help to transfer information between elements within the computing device 1300, such as during start-up. The RAM 1304 can also comprise a high-speed RAM such as static RAM for caching data.

According to some example embodiments, the computing device 1300 can further comprise an internal hard disk drive (HDD) 1312 (e.g., EIDE, SATA), which internal hard disk drive 1312 can also be configured for external use in a suitable chassis (not shown), a magnetic floppy disk drive (FDD) 1313, (e.g., to read from or write to a removable diskette 1314) and an optical disk drive 1315, (e.g., reading a CD-ROM disk or, to read from or write to other high capacity optical media such as the DVD). In some examples, the hard disk drive 1312, magnetic disk drive 1313 and optical disk drive 1315 can be connected to the system bus 1301 by a hard disk drive interface 1306, a magnetic disk drive interface 1307 and an optical drive interface 1308, respectively. According to some example embodiments, the interface 1306 for external drive implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the electronic device the drives and media accommodate the storage of any data in a suitable digital format. Although the description of computer-readable media above refers to a HDD, a removable magnetic diskette, and a removable optical media such as a CD or DVD, it may be appreciated by those skilled in the art that other types of media which are readable by an electronic device, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 1304, including an operating system 1319, one or more application programs 1320, other program modules 1321 and program data 1322. To this end, in some examples, all or portions of the operating system, applications, modules, and/or data can also be cached in the RAM 1304. It is to be appreciated that the various embodiments can be implemented with various commercially available operating systems or combinations of operating systems.

According to some example embodiments, a user can enter commands and information into the computing device through one or more wired/wireless input devices, e.g., a keyboard 1325 and a pointing device, such as a mouse 1326. Other input devices (not shown) may include a microphone, an IR remote control, a joystick, a game pad, a stylus pen, touch screen, or the like. In some examples, these and other input devices are often connected to the processing unit 1302 through an input device interface 1310 that is coupled to the system bus 1301, but can be connected by other interfaces, such as a parallel port, an IEEE 1384 serial port, a game port, a USB port, an IR interface, etc.

According to some example embodiments, a monitor 1324 or other type of display device can also be connected to the system bus 1301 through an interface, such as a video adapter 1309. In addition to the monitor 1324, the computing device 1300 can also comprise other peripheral output devices (not shown), such as speakers, printers, etc.

According to some example embodiments, the computing device 1300 can operate in a networked environment using logical connections by wired and/or wireless communications to one or more remote computers, such as a remote computer(s) 1327. In some examples, the remote computer (s) 1327 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1328 is illustrated. According to some example embodiments, the logical connections depicted include wired/wireless connectivity to a local area network (LAN) 1330 and/or larger networks, e.g., a wide area network (WAN) 1329. Such LAN and WAN networking environments are commonplace in offices and companies, and facilitate enterprise-wide computer networks, such as intranets, all of which may connect to a global communications network, e.g., the Internet.

In some examples, when used in a LAN networking environment, the computing device 1300 can be connected to the LAN 1330 through a wired and/or wireless communication network interface or adapter 1311. The adapter 1311 may facilitate wired or wireless communication to the LAN 1330, which may also include a wireless access point disposed thereon for communicating with the wireless adapter 1311.

In alternate examples, when used in a WAN networking environment, the computing device 1300 can include a modem 1318, or can be connected to a communications server on the WAN 1329 or has other means for establishing communications over the WAN 1329, such as by way of the Internet. The modem 1318, which can be internal or external and a wired or wireless device, is connected to the system bus 1301 through the input device interface 1310. In a networked environment, program modules depicted relative to the computer, or portions thereof, can be stored in the remote memory/storage device 1328. It will be appreciated that the network connections shown are exemplary and other means of establishing a communications link between the computers can be used.

According to some example embodiments, the computing device 1300 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. Further, in accordance with some example embodiments described herein, a Wi-Fi network can be used to connect computers or the plurality of electronic devices to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "9BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A method comprising:
   receiving, by a processor of a first device, a voice command from a worker in a workplace, wherein the voice command is indicative of a battery level of the first device;
   pausing, by the processor, a workflow operation executing on the first device;

performing, by the processor, a voice recognition to analyze the voice command of the worker;

activating, by the processor, a communication module of the first device based on the voice recognition, to identify a second device in proximity to the first device;

terminating, by the processor, a connection between the first device and a wearable electronic device; and transferring, by the processor, information from the first device to the second device.

2. The method of claim 1, wherein the connection corresponds to at least one of a wireless connection, a wired connection.

3. The method of claim 1, wherein the information transferred from the processor of the first device to the second device facilitates the second device to resume the workflow operation, and wherein the information comprises voice templates, tasks related information, configuration information and another connected device's information.

4. The method of claim 1, wherein the information from the first device is transferred to the second device, in response to the first device being placed near to the second device.

5. A first device comprising:

a memory that stores computer executable-instructions;

a processor in communication with a server, wherein the processor is configured to execute the computer-executable instructions to perform operations, comprising:

receive, a voice command from a worker in a workplace, wherein the voice command is indicative of a battery level of the first device;

pause a workflow operation executing on the first device;

perform, via a speech recognizer of the first device, a voice recognition to analyze the voice command of the worker;

activate based on the voice recognition, a communication module of the first device to identify a second device in proximity to the first device;

terminate a connection between the first device and a wearable electronic device; and transfer information from the first device to the second device.

6. The first device of claim 5, wherein the connection corresponds to at least one of a wireless connection, a wired connection, or a Bluetooth classic connection.

7. The first device of claim 5, wherein the information transferred from the first device to the second device facilitates the second device to resume the workflow operation, and wherein the information comprises voice templates, tasks related information, configuration information and another connected device's information.

8. The first device of claim 7, wherein the first device transfers the information to the second device via at least one of a Bluetooth, Near Field Communications, Bluetooth low energy (BLE) protocol or a Wi-Fi (Wireless Fidelity) network.

9. The first device of claim 7, wherein the workflow operation is resumed on the second device, in response to the second device receiving information from the server, wherein the information comprises voice templates, tasks related information and another connected device's information.

10. The first device of claim 5, wherein the communication module comprises at least an NFC (Near Field Communication) module.

11. The first device of claim 9, wherein the workflow operation is resumed by restarting the workflow operation from a step where the workflow operation was paused.

12. The first device of claim 10, wherein the NFC module is enabled to identify the second device, in response to a button on the first device being pressed.

13. The first device of claim 5, wherein the information from the first device is transferred to the second device, in response to the first device being placed near to the second device.

* * * * *